United States Patent
Mitsumoto

(10) Patent No.: US 7,202,810 B2
(45) Date of Patent: Apr. 10, 2007

(54) RADAR APPARATUS AND RADAR SIGNAL PROCESSING METHOD

(75) Inventor: Masashi Mitsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 121 days.

(21) Appl. No.: 11/030,877

(22) Filed: Jan. 10, 2005

(65) Prior Publication Data

US 2006/0055587 A1 Mar. 16, 2006

(30) Foreign Application Priority Data

Jul. 20, 2004 (JP) ............... 2004-211702

(51) Int. Cl.
G01S 13/42 (2006.01)

(52) U.S. Cl. ............... 342/70; 342/107; 342/192; 342/115; 342/81; 342/157

(58) Field of Classification Search ............ 342/70, 342/107, 192, 115, 81, 157
See application file for complete search history.

(56) References Cited

U.S. PATENT DOCUMENTS 6,246,357 B1 6/2001 Uehara

2006/0055587 A1* 3/2006 Mitsumoto .................. 342/70

FOREIGN PATENT DOCUMENTS

JP 11-118916 A 4/1999
JP 2000-338222 A 12/2000

* cited by examiner

Primary Examiner—Dan Pihulic
(74) Attorney, Agent, or Firm—Sughrue Mion, PLLC

(57) ABSTRACT

A radar apparatus and a radar signal processing method can prevent misdetection even in the case of targets running side by side without an azimuth angle error being varied in accordance with the velocities of the targets. An antenna direction control part controls the direction of an antenna so as to vary the directions of radar beams at the time of observation in up phases and at the time of observation in down phases. An azimuth angle calculation section of a signal processing part calculates azimuth angles in up and down phases, and an azimuth angle determination section of the signal processing part selects an output content of observation data concerning a target to be detected from the amplitude of a difference between the azimuth angles in up and down phase.

11 Claims, 12 Drawing Sheets

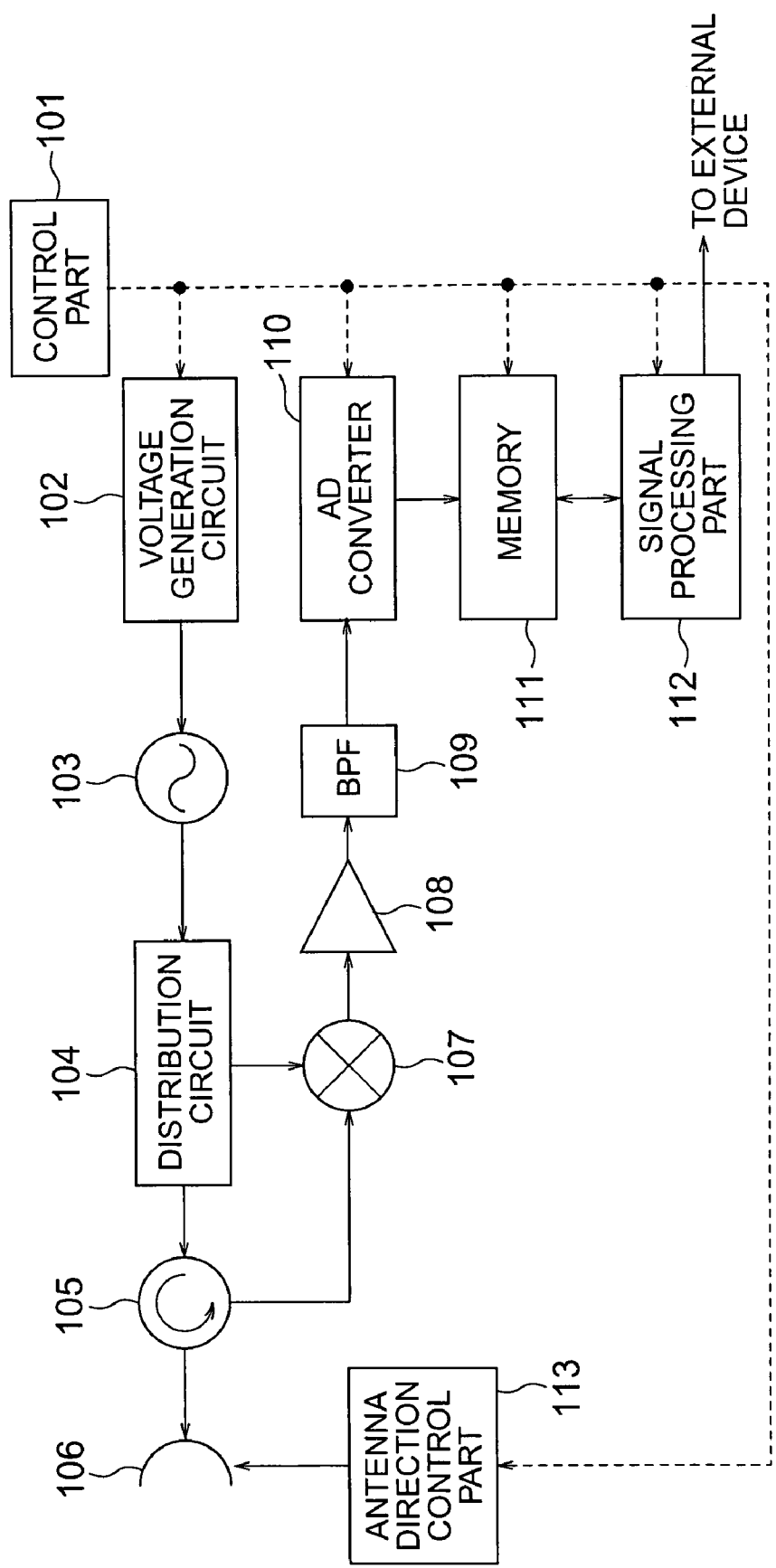

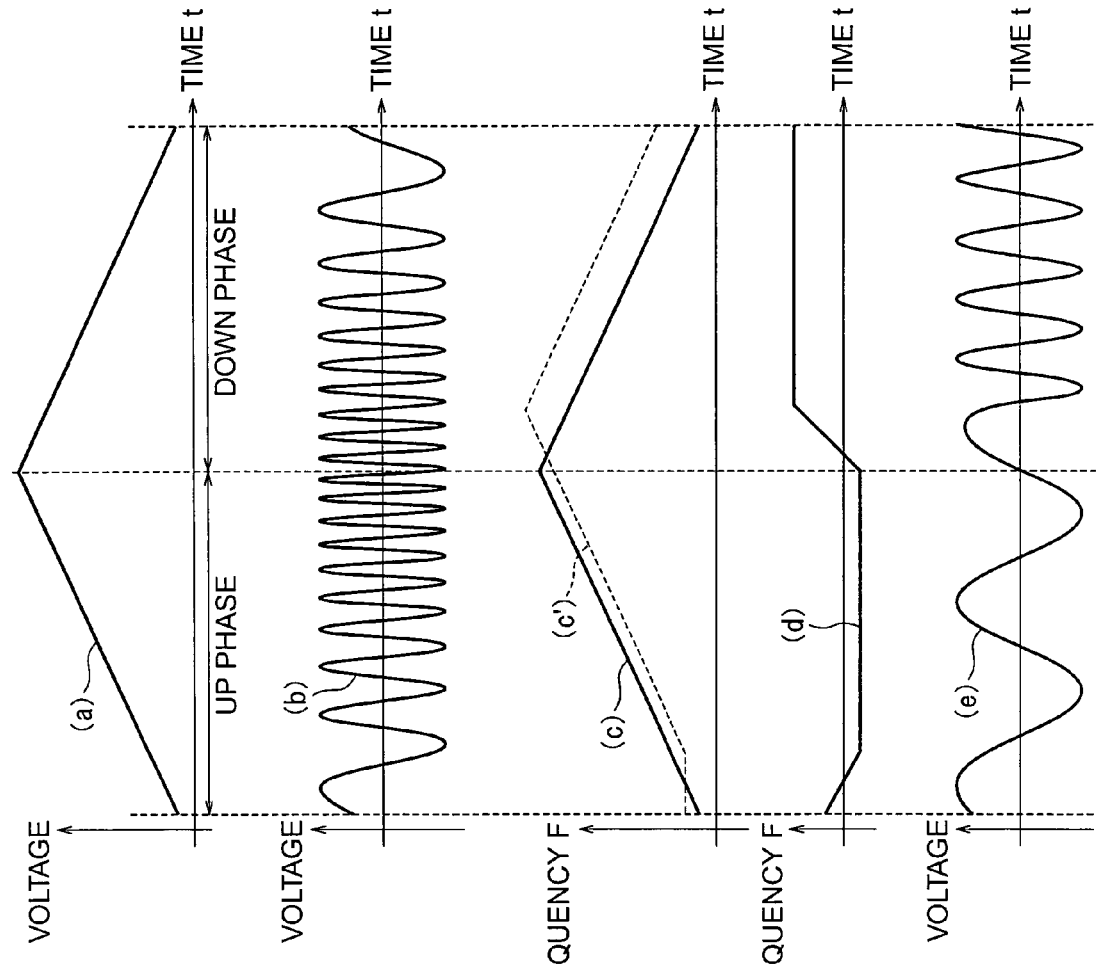

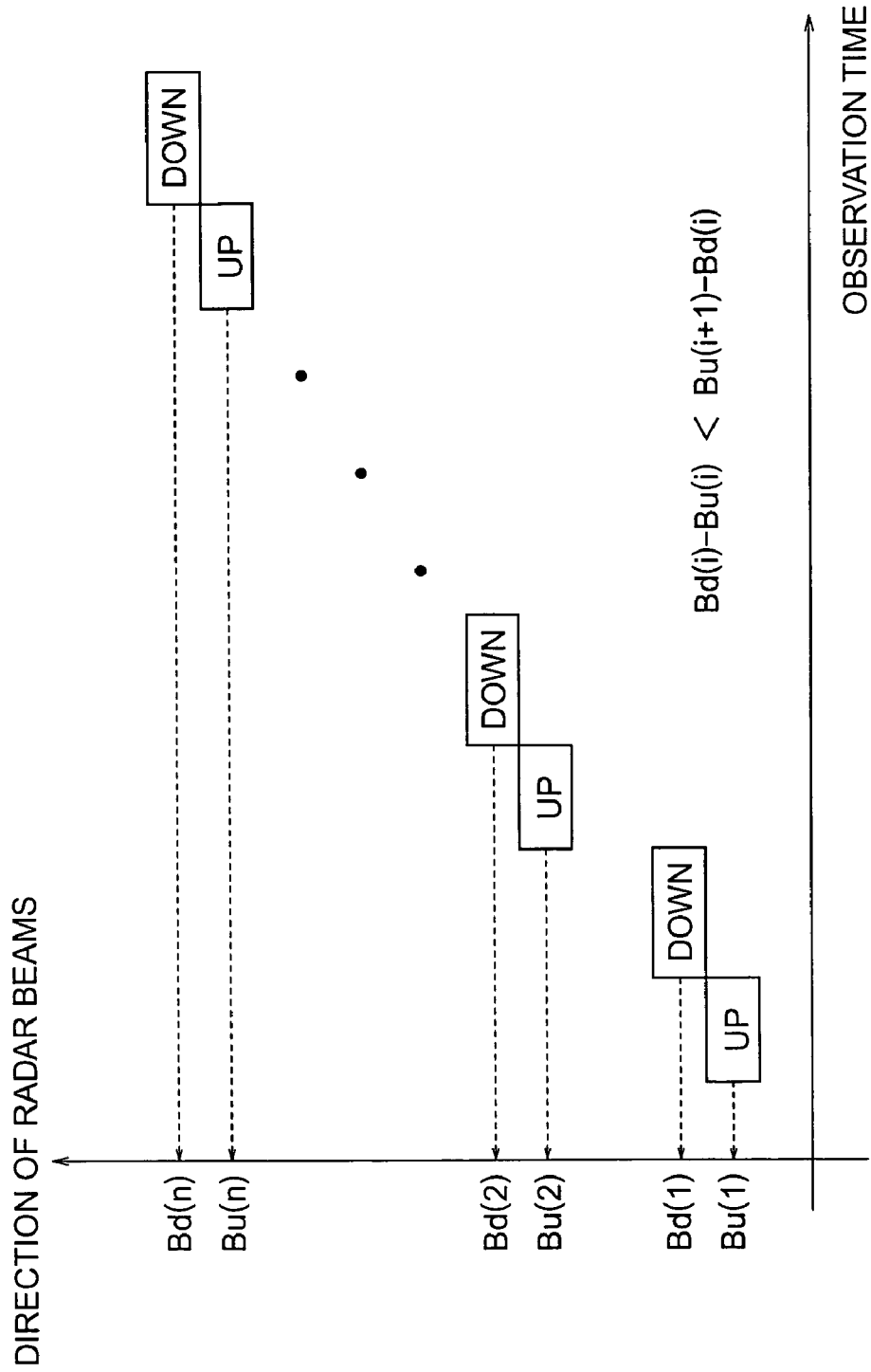

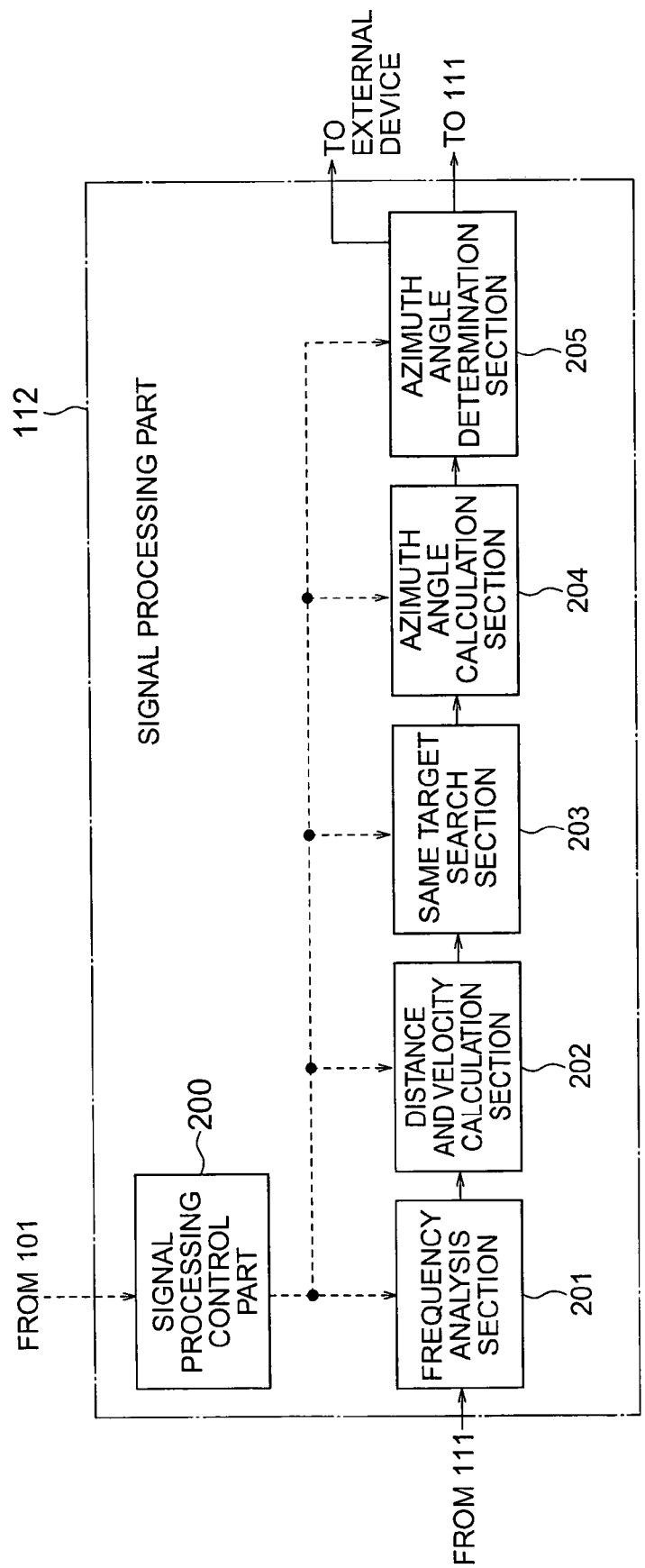

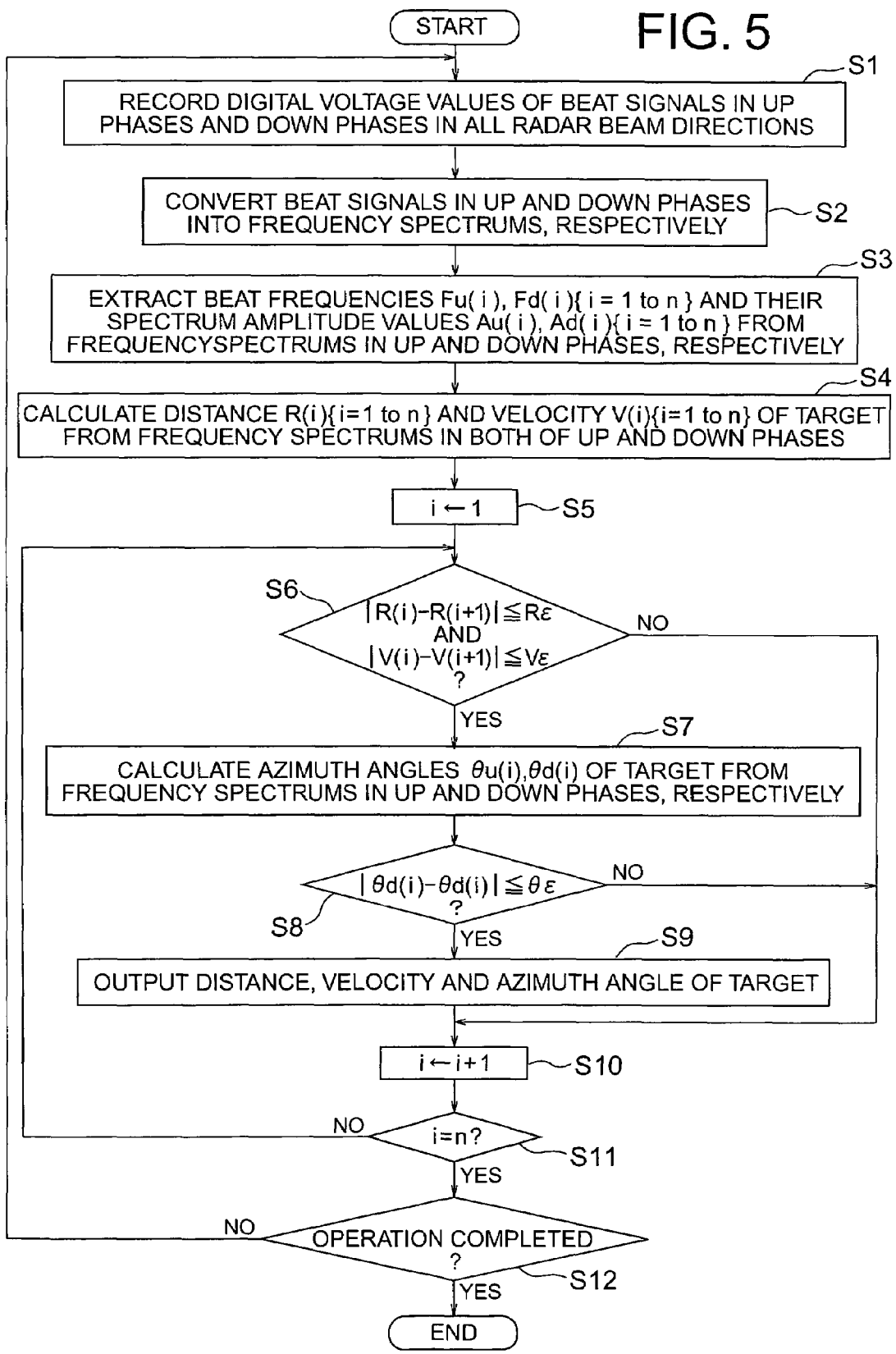

RADAR APPARATUS AND RADAR SIGNAL PROCESSING METHOD

BACKGROUND OF THE INVENTION

1. Field of the Invention

The present invention relates to a radar apparatus and a radar signal processing method adapted to be installed on a movable object (vehicle, etc.) for detecting an object to be observed (hereinafter referred to as a "target"). More particularly, the invention relates to a technique that sends a radar beam as a transmitted signal and receives it as a received signal while changing the direction of an antenna so as to change the direction of the radar beam with respect to the antenna, observes a beat signal comprising up phases and down phases that is generated by mixing the frequency-modulated transmission and received signals with each other, and measures observation data including the distance, the velocity or the azimuth angle of the target relative to the antenna.

2. Description of the Related Art

In the past, the distance of a target to be detected in such a kind of radar apparatus is in the range of from a few meters to several hundred meters.

In addition, as an antenna (aerial) installed on a movable object, it is desirable to use a single transmission and reception antenna constructed for combined use with transmission and reception so as to reduce the size of the apparatus.

In order to satisfy the above requirement, there has been proposed a radar apparatus that measures the azimuth angle of a target by measuring the distance and velocity of the target by means of an FMCW (Frequency Modulated Continuous Wave) method and changing the direction of the single antenna of the combined transmission and reception construction (for instance, see a first patent document (Japanese patent application laid-open No. 11-118916) and a second patent document (Japanese patent application laid-open No. 2000-338222)).

In these conventional apparatuses, a continuous wave, comprising first modulation periods (up phases) in which the frequency thereof is becoming higher over time and second modulation periods (down phases) in which the frequency is becoming lower over time, is radiated from the combined transmission and reception antenna as a transmitted signal, and a reflected wave from a target in the form of an object to be measured is received by the transmission and reception antenna as a received signal.

Then, the received signal is mixed with the transmitted signal to generate a beat signal, which is observed in its up and down phases, so that frequencies (beat frequencies) corresponding to the target in the individual phases, respectively, are extracted, and the distance and velocity of the target are calculated from these two frequencies.

Moreover, by changing the direction of the transmission and reception antenna in accordance with the observation time, the direction of the radar beam (transmitted signal) radiated from the antenna is changed so as to scan an observation space, whereby the spectral amplitude values of the individual beat frequencies extracted from beat signals observed with radar beams of two different directions among radar beams of varying directions are measured respectively, and the azimuth angle of the target is calculated from the two spectral amplitude values thus obtained.

For instance, in the above-mentioned first patent document, attention is focused on the feature that the observation timings and the directions of radar beams in up and down phases are different between in one phase (e.g., up phase) and in the other phase (i.e., down phase) following the one phase. That is, on the basis of this relation, the azimuth angle of the target is calculated from the spectral amplitude value of the beat frequency extracted in the one phase and the spectral amplitude value of the beat frequency extracted in the other phase.

In the case of the first patent document, when the beat frequency in up phases and that in down phases are different from each other, the measured spectral amplitude value changes (increases or decreases) from its original or intrinsic value depending on the frequency thereof unless the frequency characteristic of the receiving circuit is constant. Therefore, it is desirable to make the frequency characteristic of the receiving circuit constant so as not to generate a large error in the azimuth angle calculated from the spectral amplitude value.

On the other hand, in the above-mentioned second patent document, focus is placed on the fact that the observation timings and the directions of radar beams in up and down phases are equal to each other in a certain pair of up and down phases, but different from each other in the following pair of up and down phases. That is, on the basis of this relation, the azimuth angle of the target is calculated from the spectral amplitude value of the beat frequency extracted in an up phase (or a down phase) of a certain direction of the radar beam and the spectral amplitude value of the beat frequency extracted in the up phase (or the down phase) of a direction of the radar beam adjacent to this direction.

Here, the radar signal processing method according to the above-mentioned second patent document will be specifically described while referring to an explanatory view of FIG. 12.

FIG. 12 shows the principle for calculating an azimuth angle from spectral amplitude values. In FIG. 12, the axis of abscissa corresponds to the direction of radar beams B(I) through B(I+3) and azimuth angles θ(I) through θ(I+2) which become detection results, and the axis of ordinate corresponds to spectral amplitude values A(I) through A(I+3) of the beat frequencies corresponding to targets. In FIG. 12, there exist a first target and a second target (e.g., two targets running side by side) having substantially the same distance and the same velocity at two azimuth angles θ(I), θ(I+2) indicated by outline arrows, respectively.

Here, reference will be made to the case where radar beams are transmitted toward the individual targets in directions B(I) through B(I+3) (see four parabolic curves) so as to acquire spectral amplitude values A(I) through A(I+3) of the beat frequencies corresponding to the respective targets.

In this case, in a radar beam in a direction B(I), the spectral amplitude value of the beat frequency corresponding to the first target becomes a value A(I) indicated by a "black diamond mark" in this figure. Also, in a radar beam in a direction B(I+1), the spectral amplitude value of the beat frequency corresponding to the first target becomes a value A(I+1) indicated by a "black square mark" in this figure. In addition, in a radar beam in a direction B(I+2), the spectral amplitude value of the beat frequency corresponding to the second target becomes a value A(I+2) indicated by a "black triangular mark" in this figure. Moreover, in a radar beam in a direction B(I+3), the spectral amplitude value of the beat frequency corresponding to the second target becomes a value A(I+3) indicated by a "black inverse triangular mark" in this figure. Here, note that the azimuth angles of the radar beams in the directions B(I), B(I+1) are calculated in the range of from the direction B(I) to the direction B(I+1). Therefore, as shown by the "black diamond mark" and the "black square mark", the azimuth angle θ(I) of the first target is obtained as the result of detection from the spectral amplitude values A(I), A(I+1).

Similarly, the azimuth angles of the radar beams in the directions B(I+2), B(I+3) are calculated in the range of from the direction B(I+2) to the direction B(I+3). Accordingly, from the spectral amplitude values A(I+2), A(I+3) acquired at this time, the azimuth angle θ(I+2) of the second target is obtained as a detection result, as shown by a "black triangular mark" and a "black inverse triangular mark".

However, the azimuth angles of radar beams in the two directions B(I+1), B(I+2), which do not share the same target, are calculated in the range of from the direction B(I+1) to the direction B(I+2).

At this time, from the spectral amplitude value A(I+1)(see the "black square mark") corresponding to the first target and the spectral amplitude value A(I+2)(see the "black triangular mark") corresponding to the second target, the spectral amplitude value A(I+1) of the radar beam in the direction B(I+1) is assumed to be a value indicated by a "□ mark" instead of the "black square mark", and the spectral amplitude value A(I+2) of the radar beam in the direction B(I+2) is assumed to be a value indicated by a "Δ mark" instead of the "black triangular mark". As a result, the azimuth angle θ(I+1) of a nonexistent target can be obtained, as shown by the "□ mark" and the "Δ mark".

In the conventional radar apparatuses and the conventional radar signal processing methods as referred to above, for instance in the case of the above-mentioned first patent document, it is desirable to make constant the frequency characteristic of the receiving circuit, but it is difficult to make constant the frequency characteristic of an actual receiving circuit, as a consequence of which an error in the calculation of the azimuth angle of a target varies in accordance with the moving velocity of the target, thus giving rise to a problem that the calculation error of the azimuth angle becomes large particularly with respect to a target that is moving at high velocity.

On the other hand, in the case of the above-mentioned second patent document, there is also a problem that the azimuth angle θ(I+1) corresponding to a nonexistent target is detected in addition to the azimuth angles θ(I), θ(I+2) corresponding to the existing targets.

SUMMARY OF THE INVENTION

The present invention is intended to solve the problems as referred to above, and has its object to obtain a radar apparatus and a radar signal processing method capable of avoiding variation in an error in the detection of the azimuth angle of a target in accordance with the moving velocity thereof as well as preventing misdetection even when there are a plurality of targets running side by side.

Bearing the above object in mind, according to the present invention, there is provided a radar apparatus adapted to send and receive radar beams as a transmitted signal and a received signal, respectively, while changing the direction of an antenna so as to change the direction of the radar beams with respect to the antenna, observe beat signals created by mixing the transmission and received signals frequency modulated of up phases and down phases with each other, detect a target to be observed, and measure observation data including a relative distance, a relative velocity or an azimuth angle of the target with respect to the antenna. The apparatus includes: an antenna direction control part that turns the radar beams in a plurality of preset directions; a frequency analysis section that extracts a beat frequency and a spectral amplitude value corresponding to the target from the beat signals in radar beams of predetermined directions; a distance and velocity calculation section that calculates the distance and velocity of the target based on the beat frequency in a radar beam of a predetermined direction; a same target search section that searches for the distance and velocity of the same target observed in two of the radar beams of different directions from the distances and velocities of targets calculated in the two radar beams; an azimuth angle calculation section that calculates the azimuth angle of the same target based on the spectral amplitude values of the same target observed in the two radar beams: and an azimuth angle determination section that selects an output content of the observation data concerning a target to be detected based on the azimuth angle of the same target calculated in the two radar beams.

According to the present invention, an error in the azimuth angle of a target can be avoided from being varied in accordance with the velocity of the target, and misdetection can be prevented even in the case of a plurality of targets running side by side.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 1 is a block diagram showing a radar apparatus according to a first embodiment of the present invention.

FIGS. 2A through 2E are explanatory views showing the waveforms of respective signals in the radar apparatus according to the first embodiment of the present invention.

FIG. 3 is an explanatory view showing the relation between observation timing and the directions of radar beams in the radar apparatus according to the first embodiment of the present invention.

FIG. 4 is a block diagram showing the configuration of a signal processing part in the radar apparatus according to the first embodiment of the present invention.

FIG. 5 is an explanatory view showing the signal processing procedure of the radar apparatus according to the first embodiment of the present invention.

DESCRIPTION OF THE PREFERRED EMBODIMENTS

Hereinafter, preferred embodiments of the present invention will be described in detail while referring to the accompanying drawings.

Embodiment 1

First, reference will be made to a radar apparatus and a radar signal processing method according to a first embodiment of the present invention while referring to FIG. 1 through FIGS. 6A and 6B.

Figure 6A:
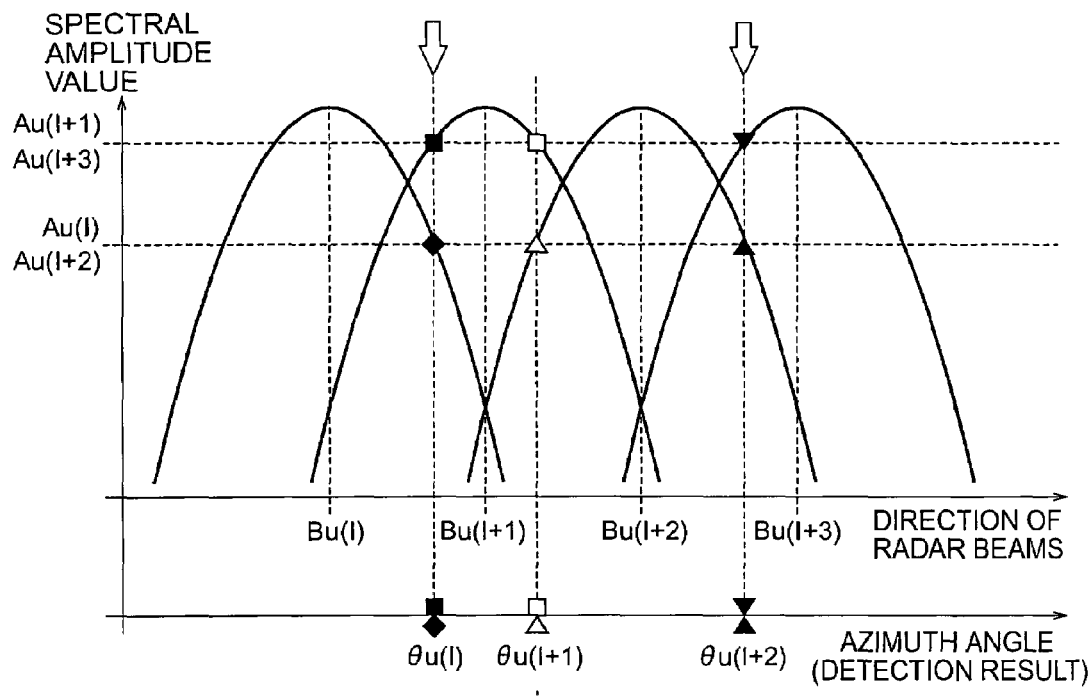
FIGS. 6A and 6B are explanatory views showing the principle for calculating the azimuth angles of targets from the spectral amplitude values thereof in the first embodiment of the present invention.
Figure 6B:
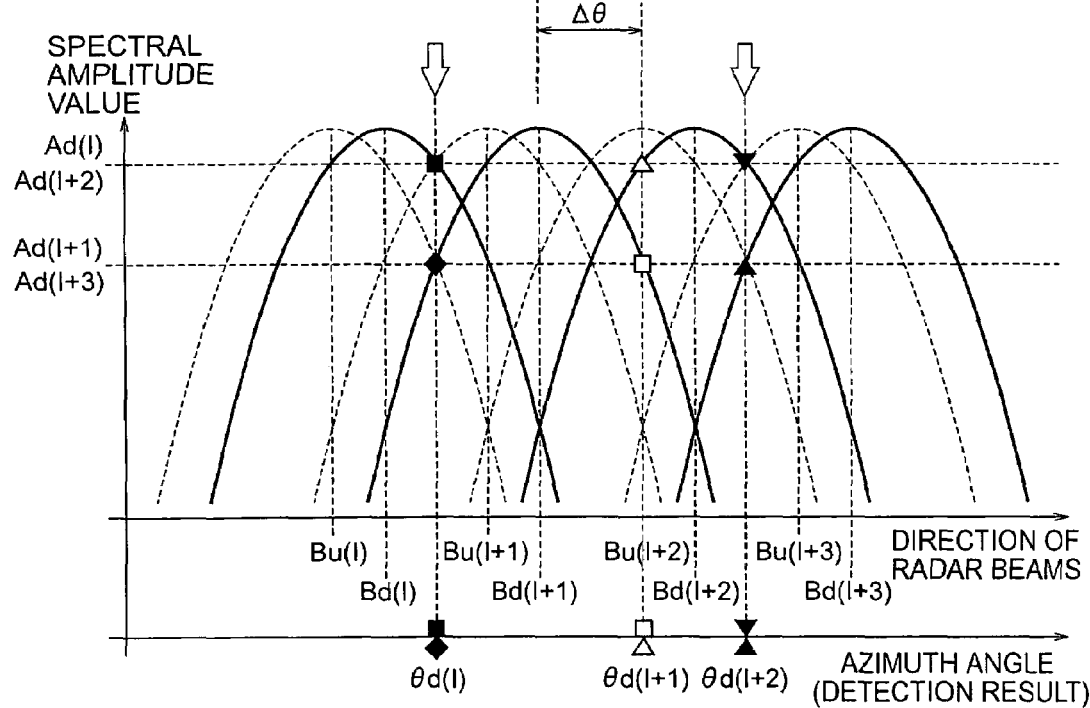
Figure 12:
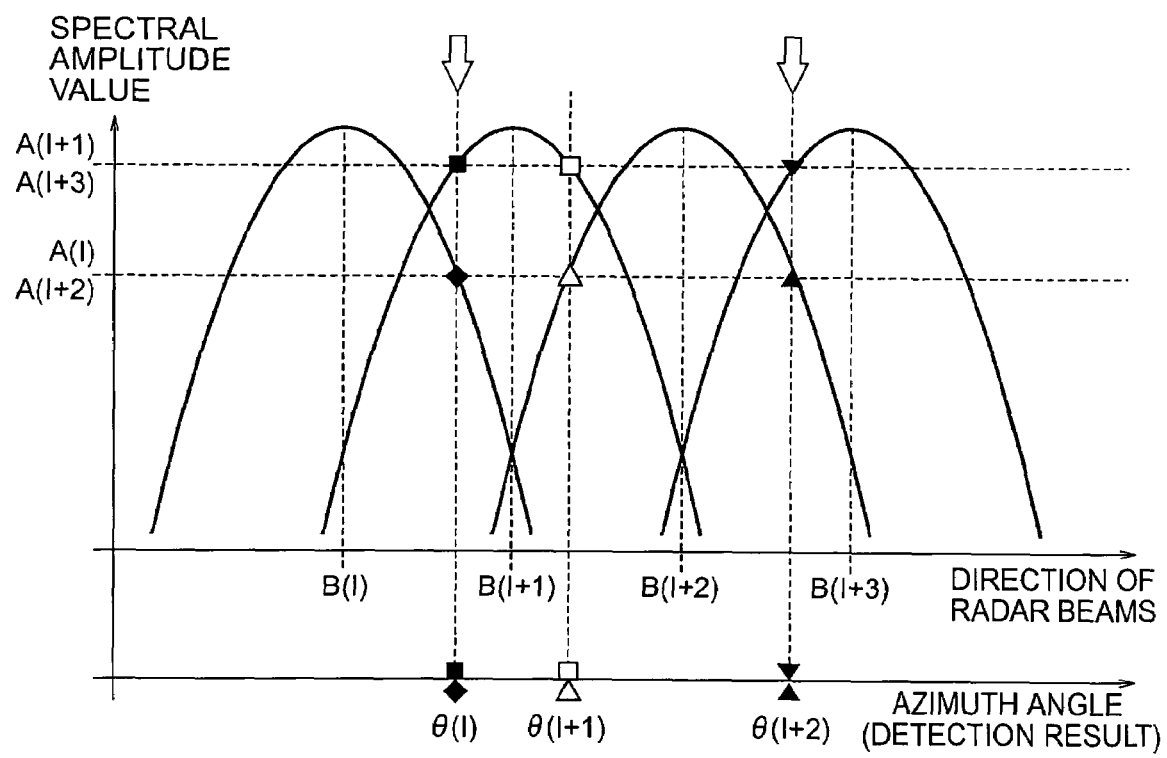
FIG. 12 is an explanatory view showing the principle for calculating the azimuth angles of targets from the spectral amplitude values thereof in a conventional radar apparatus (the second patent document).

FIG. 1 is a block diagram that illustrates the radar apparatus according to the first embodiment of the present invention, and FIGS. 2A through 2E are timing charts that illustrate the waveforms of transmission and received signals processed by the radar apparatus of FIG. 1. FIG. 3 is an explanatory view that illustrates the relation between observation timing for up phases and down phases and the directions of radar beams according to the radar apparatus of FIG. 1, and FIG. 4 is a block diagram that illustrates the detailed functional configuration of a signal processing part in FIG. 1. FIG. 5 is a flowchart that illustrates the operation (radar signal processing procedure) of the radar apparatus according to the first embodiment of the present invention. FIGS. 6A and 6B are explanatory views that illustrate the principle of calculating the azimuth angles of targets from the spectral amplitude values thereof in the first embodiment of the present invention, wherein FIG. 6A corresponds to the above-mentioned FIG. 12.

In FIG. 3, the axis of ordinate corresponds to an observation time, and the axis of abscissa corresponds to the directions of radar beams, illustrating the state in which the direction of a radar beam Bu(i) {i=1 through n} in an up phase and the direction of a radar beam Bd(i) {i=1 through n} in a down phase are sequentially changed as the observation time elapsed. Here, note that "i" is an internal variable for a counter (hereinafter also referred to simply as a "variable").

In FIG. 1, the radar apparatus includes a control part 101, a voltage generation circuit 102, a voltage controlled oscillator (VCO) 103, a distribution circuit 104, a circulator 105, a combined transmission and reception antenna 106 (hereinafter simply referred to as an "antenna"), a mixer 107, an amplifier 108, a band pass filter (BPF) 109, an analog to digital (AD) transducer 110, a memory 111, a signal processing part 112, and an antenna direction control part 113.

The voltage generation circuit 102, the AD converter 110, the memory 111, the signal processing part 112, and the antenna direction control part 113 function in response to a control signal (see a broken line arrow) from the control part 101.

The voltage generation circuit 102, the VCO 103, the distribution circuit 104, the circulator 105, and the antenna 106 together constitute a transmitter circuit for sending or transmitting a radar beam to a scanning space as a transmitted signal.

In addition, the antenna 106, the circulator 105, the mixer 107, the amplifier 108, the BPF 109, the AD converter 110, the memory 111, and the signal processing part 112 together constitute a receiver circuit for receiving a radar beam reflected from a target (not shown) in the scanning space as a received signal.

The antenna direction control part 113 serves to change the direction of the antenna 106, so that the directions of sending and receiving radar beams (i.e., the direction of scanning) can be variably set with respect to the antenna 106, thereby turning a radar beam in a plurality of preset directions.

Specifically, the antenna direction control part 113 turns the antenna 106 in such a manner that the direction of the radar beam is varied between at the time of observation in up phases and at the time of observation in down phases. That is, the radar beams are sent and received by the antenna 106 as a transmitted signal and a received signal while the direction of the radar beam being changed by the antenna direction control part 113.

At this time, the mixer 107 mixes the frequency modulated transmission and received signals of up phases and down phases with each other to create beat signals.

The signal processing part 112 observes, through the BPF 109, the AD converter 110 and the memory 111, the beat signals thus created by the mixer 107, detects targets to be observed, and measures observation data including the distance, velocity or azimuth angle of each target relative to the antenna 106. The signal processing part 112 is constituted, for example, by a central processing unit (CPU) or a combination of a CPU and a digital signal processor (DSP), and has a functional configuration including a signal processing control part 200, a frequency analysis section 201, a distance and velocity calculation section 202, a same target search section 203, an azimuth angle calculation section 204, and an azimuth angle determination section 205, as shown in FIG. 4.

In FIG. 4, the frequency analysis section 201, the distance and velocity calculation section 202, the same target search section 203, the azimuth angle calculation section 204, and the azimuth angle determination section 205 function in response to a control signal (see a broken line arrow) from the signal processing control part 200. The frequency analysis section 201 extracts a beat frequency and a spectral amplitude value corresponding to a target from a beat signal of a radar beam in a predetermined direction. The distance and velocity calculation section 202 calculates the distance and velocity of a target based on the beat frequency of a radar beam in a predetermined direction. The same target search section 203 searches for the distance and velocity of the same target observed in two radar beams from the distances and velocities of targets calculated in the two radar beams in different directions.

The azimuth angle calculation section 204 calculates the azimuth angle of the same target based on the spectral amplitude value of the same target observed in the two radar beams. Specifically, the azimuth angle calculation section 204 calculates the azimuth angle of a target in up phases based on the spectral amplitude values of the target in two up phases of radar beams in different directions, and calculates the azimuth angle of a target in down phases based on the spectral amplitude values of the target in two down phases of the radar beams in different directions.

The azimuth angle determination section 205 selects the output content of observation data concerning a target to be detected based on the azimuth angle of the same target calculated in the two radar beams. Specifically, the azimuth angle determination section 205 selects the output content of the observation data concerning the target to be detected based on the amplitude of an interphase difference between the azimuth angle in up phases and the azimuth angle in down phases calculated by the azimuth angle calculation section 204, and sends the observation data as the result of the detection to an external device (not shown).

Now, the signal processing operation of the radar apparatus according to the first embodiment of the present invention as illustrated in FIG. 1 will be described while referring to the timing charts of FIGS. 2A through 2E.

First of all, the control part 101 controls the timing or the like of the voltage generation circuit 102, so that a voltage, changing in a triangular wave manner over time as shown by a waveform (a) in FIG. 2A, is created from the voltage generation circuit 102, and is applied to the VCO 103.

The VCO 103 creates a frequency modulation continuous wave FMCW), whose voltage and frequency F change over time as shown by waveforms (b), (c) in FIGS. 2B and 2C, respectively, in accordance with the voltage waveform (a) applied thereto, and inputs the FMCW waveforms (b), (c) to the distribution circuit 104. The waveform (b) in FIG. 2B shows the voltage change of the FMCW with respect to time t, and the waveform (c) indicated by a solid line in FIG. 2C shows the frequency change of the FMCW with respect to time t.

The distribution circuit 104 inputs a part of the input FMCW to the antenna 106 as a transmitted signal through the circulator 105, and the remainder of the FMCW to the mixer 107 as a local signal. The antenna 106 radiates the thus input transmitted signal into a space as a transmission radar beam. At this time, if there is a target in the form of an object to be measured or the like, a part of the radiated transmission radar beam can be reflected by the target or the like to again transmit through a space, so that it is received by the antenna 106 as a received signal of a waveform (c'), as indicated by a broken line in FIG. 2C. The received signal received by the antenna 106 is input to the mixer 107 through the circulator 105.

The mixer 107 mixes the received signal of the waveform (c') indicated by the broken line in FIG. 2C and the local signal of the waveform (c) indicated by the solid line in FIG. 2C with each other to create a beat signal which has a frequency F and a voltage both changing with respect to time t, as shown by waveforms (d) and (e) in FIGS. 2D and 2E, respectively. The waveform (d) in FIG. 2D represents the frequency change of the beat signal with respect to time t, and the waveform (e) in FIG. 2E represents the voltage change of the beat signal with respect to time t.

The beat signal created by the mixer 107 is amplified by the amplifier 108, and then input to the AD converter 110 after unnecessary frequency components have been removed therefrom by means of the BPF 109. The AD converter 110 takes in the beat signal under the control of the control part 101 in synchronization with the observation period of the up phase or the down phase (see the waveform (a) in FIG. 2A), converts the beat signal into a digital voltage value, and inputs it to the memory 111.

The memory 111 is turned into a data writing state in synchronization with the observation period of the up phase or the down phase (see the waveform (a) in FIG. 2A) under the control of the control part 101, so that it records the digital voltage value of the beat signal input from the AD converter 110. In addition, when the observation period of the up phase or the down phase is terminated, the memory 111 is turned into a data readable state in which data of the digital voltage value thus recorded can be read out under the control of the control part 101.

When the observation period of the up phase or the down phase is terminated, the signal processing part 112 takes in a digital voltage value of the beat signal in the up phase and a digital voltage value of the beat signal in the down phase under the control of the control part 101, calculates not only the distance and velocity of the target but also the azimuth angle thereof, records the calculation results in the memory 111, and inputs them to an unillustrated external device (e.g., a motion controller for a movable object, a display device, etc.).

Here, note that the above operations are carried out with the direction of the antenna 106 being changed by means of the antenna direction control part 113 under the control of the control part 101, that is, while the direction of the radar beam radiated from the antenna 106 is being changed.

Next, reference will be made to the operation of the signal processing part 112 illustrated in FIG. 4 according to this first embodiment of the present invention, while referring to the flow chart of FIG. 5 together with FIGS. 1 through 3 and FIGS. 6A, 6B. Here, a specific operation of the signal processing part 112 will be described in the case of radar beams in n directions in total being used in an observation space.

In FIG. 5, first of all, the control part 101 records in the memory 111 digital voltage values of beat signals in all directions acquired in their up phases and down phases by controlling the antenna direction control part 113 so as to change the direction of the antenna 106 (the direction of the radar beam) (step S1). Specifically, the control part 101 records in the memory 111 the digital voltage value of an up phase beat signal in a radar beam in a direction Bu(i) {i=1 through n} and the digital voltage value of a down phase beat signal in a radar beam in a direction Bd(i) {i=1 through n} by operating the voltage generation circuit 102, the AD converter 110, and the memory 111 while changing the direction of the radar beam (the direction of scanning) into the order of Bu(1), Bd(1), Bu(2), Bd(2), . . . , Bu(n), Bd(n) so as to make the relation of FIG. 3 hold.

Hereinafter, when the beat signal recording process in step S1 is terminated, the signal processing control part 200 in the signal processing part 112 controls the frequency analysis section 201, the distance and velocity calculation section 202, the same target search section 203, the azimuth angle calculation section 204 and the azimuth angle determination section 205 under the control of the control part 101 thereby to start a signal processing control operation.

First of all, the frequency analysis section 201 converts a beat signal of each phase into a frequency spectrum (step S2). Specifically, the frequency analysis section 201 reads the digital voltage value of the beat signal from the memory 111. For instance, by performing FFT (Fast Fourier Transform) processing or the like, the frequency spectrum of an up phase beat signal in a radar beam in a direction Bu(i) {i=1 through n} and the frequency spectrum of a down phase beat signal in a radar beam in a direction Bd(i) {i=1 through n} are acquired.

Subsequently, the frequency analysis section 201 detects, for example, a maximum peak of the spectral amplitude value from the frequency spectrum acquired in step S2, extracts a beat frequency F(i) and a spectral amplitude value A(i) which can be assumed to correspond to a target (step S3), and inputs the information thus extracted to the distance and velocity calculation section 202. At this time, the extraction information input from the frequency analysis section 201 to the distance and velocity calculation section 202 contains an up phase beat frequency Fu(i) {i=1 through n} in the radar beam in the direction Bu(i) {i=1 through n} and its spectral amplitude value Au(i) {i=1 through n} as well as a down phase beat frequency Fd(i) {i=1 through n} in the radar beam in the direction Bd(i) {i=1 through n} and its spectral amplitude value Ad(i) {i=1 through n}.

Then, the distance and velocity calculation section 202 calculates a distance R(i) {i=1 through n} from the antenna 106 to the target and a moving velocity V(i) {i=1 through n} of the target from the up phase beat frequency Fu(i) {i=1 through n} and the down phase beat frequency Fd(i) {i=1 through n} among the input beat frequencies F(i) and the input spectral amplitude values A(i) based on the distance and velocity measurement principle of a well-known FMCW radar according to the following expressions (1), (2) (step S4).

$$R(i)=Kr\times\{-Fu(i)+Fd(i)\} \qquad (1)$$

$$V(i)=Kv\times\{Fu(i)+Fd(i)\} \qquad (2)$$

where Kr is a distance conversion factor, and Kv is a velocity conversion factor.

Only when a combination of a distance and a velocity, being within preset reference ranges, respectively, are acquired from the expressions (1) and (2), the distance and velocity calculation section 202 inputs the distance and the velocity within the reference range as well as the spectral amplitude values in the up phase and the down phase to the same target search section 203. At this time, the information thus input from the distance and velocity calculation section 202 to the same target search section 203 contains the distance R(i) {i=1 through n}, the velocity V(i) {i=1 through n}, the spectral amplitude values Au(i) {i=1 through n} and Ad(i) {i=1 through n}.

Subsequent to the above-mentioned step S4, the signal processing control part 200 initializes a counter internal variable i to "1" (step S5).

Thereafter, the same target search section 203 determines, from the distance and velocity input from the distance and velocity calculation section 202, the spectral amplitude value in the up phase and the spectral amplitude value in the down phase by using preset error tolerance thresholds $R_e$, $V_e$, whether variable i satisfies the following conditional expressions (3), (4) at the same time, and searches for an appropriate variable i satisfying the conditional expressions (step S6).

$$|R(i)-R(i+1)| \leq R_e \qquad (3)$$

$$|V(i)-V(i+1)| \leq V_e \qquad (4)$$

where i is a value within the range of "1 through n−1".

When it is determined in step S6 that variable i does not satisfy either of expressions (3), (4) (i.e., No), the control flow proceeds to step S10 where variable i is incremented, without executing the steps S7 through S9.

On the other hand, if it is determined in step S6 that variable i satisfies both of expressions (3), (4) (i.e., Yes) (hereinafter, the variable i in this case being described as "I"), the same target search section 203 inputs the distance and velocity at this time and the spectral amplitude values in the up phase and in the down phase to the azimuth angle calculation section 204.

That is, the information input from the same target search section 203 to the azimuth angle calculation section 204 includes distances R(I), R(I+1) and velocities V(I), V(I+1) satisfying expressions (3), (4) above, their related spectral amplitude values Ad(I), Ad(I+1) in the up phase, and their related spectral amplitude values Au(I), Au(I+1) in the down phase.

Subsequently, the azimuth angle calculation section 204 calculates an azimuth angle θd(I) in the up phase and an azimuth angle θu(I) in the down phase from the spectral amplitude values in the up and down phases input thereto by using the following expressions (5), (6) (step S7).

$$\theta u(I)=\{Au(I+1)-Au(I)\}/\{Au(I+1)+Au(I)\}\times Ku(I)+\{Bu(I+1)+Bu(I)\}/2 \qquad (5)$$

$$\theta d(I)=\{Ad(I+1)-Ad(I)\}/\{Ad(I+1)+Ad(I)\}\times Kd(I)+\{Bd(I+1)+Bd(I)\}/2 \qquad (6)$$

where Ku(I) represents an azimuth angle conversion factor in radar beams of directions Bu(I), Bu(I+1), and Kd(I) represents an azimuth angle conversion factor in radar beams of directions Bd(I), Bd(I+1).

The azimuth angles θu(I), θd(I) in the up and down phases calculated according to expressions (5), (6), respectively, are input to the azimuth angle determination section 205 together with the distances and velocities calculated above. That is, the information input from the azimuth angle calculation section 204 to the azimuth angle determination section 205 include the distances R(I), R(I+1), the velocities V(I), V(I+1), and the azimuth angles θu(I), θd(I).

Here, reference will be made to the properties of the azimuth angles θu(I), θd(I) calculated in step S7 while referring to FIGS. 6A, 6B. In FIGS. 6A, 6B, similar to the above discussions, it is assumed that there exist targets (e.g., two targets running side by side) with their distances and velocities being substantially equal to each other in two directions indicated at outline arrows, respectively, and changes in the azimuth angles of the targets being observed in radar beams of n directions are so small as to be ignored.

First of all, in the up phase shown in FIG. 6A, the spectral amplitude value of a beat frequency Fu(I) corresponding to one or a first target in a radar beam of the direction Bu(I) is the value Au(I) indicated at a "black diamond mark"; the spectral amplitude value of a beat frequency Fu(I+1) corresponding to the first target in a radar beam of the direction Bu(I+1) is the value Au(I+1) indicated at a "black square mark"; the spectral amplitude value of a beat frequency Fu(I+2) corresponding to another or a second target in a radar beam of the direction Bu(I+2) is a value Au(I+2) indicated at a "black triangular mark"; and the spectral amplitude value of a beat frequency Fu(I+3) corresponding to the second target in a radar beam of the direction Bu(I+3) is a value Au(I+3) indicated at a "black inverse triangular mark".

At this time, in the above processes (steps S1 through S7), the azimuth angle of the first target is calculated from the spectral amplitude values Au(I), Au(I+1) in the radar beams of the directions Bu(I), Bu(I+1) within the range of from the direction Bu(I) to the direction Bu(I+1). Accordingly, an azimuth angle θu(I) indicated by the "black diamond mark" and the "black square mark" is calculated from expression (5) above.

Similarly, the azimuth angle of the second target is calculated from the spectral amplitude values Au(I+2), Au(I+3) in the radar beams of the directions Bu(I+2), Bu(I+3) within the range of from the direction Bu(I+2) to the direction Bu(I+3). Accordingly, an azimuth angle θu(I+2) indicated by the "black triangular mark" and the "black inverse triangular mark" is calculated from expression (5) above.

Further, as stated above, an azimuth angle is calculated from the spectral-amplitude values Au(I+1), Au(I+2) in the radar beams of the directions Bu(I+1), Bu(I+2) within the range of from the direction Bu(I+1) to the direction Bu(I+2).

Therefore, the spectral amplitude value Au(I+1) in the radar beam of the direction Bu(I+1) is assumed to be a value not indicated at the "black square mark" but at the "□ mark", and the spectral amplitude value Au(I+2) in the radar beam of the direction Bu(I+2) is assumed to be a value not indicated at the "black triangular mark" but at the "Δ mark". Accordingly, an azimuth angle θu(I+1) indicated by the "□ mark" and the "Δ mark" is also calculated from expression (5) above. As a consequence, the azimuth angle θu(I+1) not corresponding to any target is obtained besides the azimuth angles θu(I), θu(I+2) corresponding to the targets of real existence.

Moreover, in the down phase shown in FIG. 6B, too, if it is assumed that changes in the azimuth angles of the targets of two directions indicated at outline arrows are so small as to be ignored, as in the case of the above-mentioned up phase, the spectral amplitude value of a beat frequency Fd(I) corresponding to the first target in a radar beam of a direction Bd(I) becomes a value Ad(I) indicated at a "black diamond mark", and the spectral amplitude value of a beat frequency Fd (I+1) corresponding to the first target in a radar beam of a direction Bd(I+1) becomes a value Ad(I+1) indicated at a "black square mark".

In addition, the spectral amplitude value Ad(I+2) of a beat frequency Fd(I+2) corresponding to the second target in a radar beam of a direction Bd(I+2) becomes a value indicated at a "black triangular mark", and the spectral amplitude value Ad(I+3) of a beat frequency Fd(I+3) corresponding to the second target in a radar beam of a direction Bd(I+3) becomes a value indicated at a "black inverse triangular mark". At this time, in the above processes (steps S1 through S7), the azimuth angle of the first target is calculated from the spectral amplitude values Ad(I), Ad(I+1) in the radar beams of the directions Bd(I), Bd(I+1) within the range of from the direction Bd(I) to the direction Bd(I+1). Therefore, an azimuth angle θd(I) indicated by the "black diamond mark" and the "black square mark" is calculated from expression (6) above.

Similarly, the azimuth angle of the second target is calculated from the spectral amplitude values Ad(I+2), Ad(I+3) in the radar beams of the directions Bd(I+2), Bd(I+3) within the range of from the direction Bd(I+2) to the direction Bd(I+3), so an azimuth angle θd(I+2) indicated by the "black triangular mark" and the "black inverse triangular mark" is calculated from expression (6) above.

In addition, an azimuth angle is calculated from the spectral amplitude values Ad(I+1), Ad(I+2) in the radar beams of the directions Bd(I+1), Bd(I+2) within the range of from the direction Bd(I+1) to the direction Bd(I+2). Accordingly, the spectral amplitude value Ad(I+1) in the radar beam of the direction Bd(I+1) is assumed to be a value not indicated at the "black square mark" but at the "□ mark", and the spectral amplitude value Ad(I+2) in the radar beam of the direction Bd(I+2) is assumed to be a value not indicated at the "black triangular mark" but at the "Δ mark". Accordingly, an azimuth angle θd(I+1) indicated at the "□ mark" and the "Δ mark" is calculated from expression (6) above. As a consequence, the azimuth angle θd(I+1) not corresponding to any target is obtained besides the azimuth angles θd(I), θd(I+2) corresponding to the targets of real existence.

Here, in consideration of the azimuth angle in the up phase (see FIG. 6A) and the azimuth angle in the down phase (see FIG. 6B), it is found that each of a difference between the azimuth angles θu(I), θd(I) corresponding to a first or left target of real existence and a difference between the azimuth angles θu(I+2), θd(I+2) corresponding to the second or right target of real existence is smaller than a difference Δθ between the azimuth angles θu(I+1), θd(I+1) not corresponding to either of the targets. Accordingly, it is found that by comparing the amplitude of the difference between the azimuth angles θu(I), θd(I) calculated in step S7 with a predetermined value (an error tolerance threshold $\theta_\epsilon$), an azimuth angle not corresponding to any target of real existence can be determined, thus making it possible to prevent misdetection of a non-existing target.

Reverting to FIG. 5, subsequent to step S7, by making use of the properties of the azimuth angles θu(I), θd(I) as stated above, the azimuth angle determination section 205 determines based on the error tolerance threshold $\theta_\epsilon$ set beforehand whether the azimuth angle θd(I) in the up phase and the azimuth angle θu(I) in the down phase satisfy the following conditional expression (7) (step S8).

$$|\theta u(I) - \theta d(I)| \leq \theta_\epsilon \quad (7)$$

When it is determined in step S8 that the azimuth angles θu(I), θd(I) do not satisfy expression (7) above (i.e., No), the control flow proceeds to step S10 where variable i is incremented, without executing step S9.

On the other hand, when it is determined in step S8 that the azimuth angles θu(I), θd(I) satisfy expression (7) above (i.e., Yes), it is assumed that the azimuth angles θu(I), θd(I) calculated are correct detection results, the azimuth angle determination section 205 outputs these azimuth angles θu(I), θd(I) as observation data of the detection results (step S9). Specifically, from the distances R(I), R(I+1), the velocities V(I), V(I+1) and the azimuth angles θu(I), θd(I), which satisfy expression (7) above, the azimuth angle determination section 205 outputs, as the observation data concerning the targets (the detection results), a distance of Ro, a velocity of Vo and an azimuth angle of θo, which are calculated according to the following expressions (8) through (10), for instance.

$$R = \{R(I) + R(I+1)\}/2 \quad (8)$$

$$V = \{V(I) + V(I+1)\}/2 \quad (9)$$

$$\theta = \{\theta u(I) + \theta d(I)\}/2 \quad (10)$$

Thereafter, the signal processing control part 200 increments an counter internal variable i (step S10), and compares the value of the variable i with the number of directions n of the radar beams so as to determine whether the variable i is equal to the number of directions n (i=n) (step S11). When a negative determination is made in step S11 (i≠n) (i.e., No), the processing for all the directions has not yet been completed, and hence a return to step S6 is carried out so that the processes (steps S6 through S10) for the following radar beam are repeatedly executed.

On the other hand, when a positive determination is made in step S11 i=n) (i.e., Yes), the signal processing control part 200 notifies to the control part 101 the fact that the processing for the entire observation space has been completed. In response to this, the control part 101 determines whether the operation has been completed (step S12), and if determined as negative (i.e., No), a return is performed to step S1 where the following observation is started, whereas if determined as positive (i.e., Yes), the processing routine of FIG. 5 is terminated.

Thus, in the radar apparatus that measures observation data for targets (relative distances, relation velocities, azimuth angles, etc.,) by observing beat signals based on sending and receiving signals of the up phase and the down phase (frequency modulation) while changing the direction of the antenna 106, the antenna direction control part 113 controls the direction of the antenna 106 so as to make the directions of radar beams at the time of observation in up phases different from those at the time of observation in down phases, and the signal processing part 112, including the frequency analysis section 201, the distance and velocity calculation section 202, the same target search section 203, the azimuth angle calculation section 204 and the azimuth angle determination section 205, operates to observe the beat signals in the up and down phases in which the directions of the radar beams are different from each other, so that the output content of the observation data concerning each target to be detected can be appropriately selected in accordance with the azimuth angle of the target calculated with two radar beams of different directions. With such an arrangement, it is possible to prevent misdetection of the targets.

In addition, the azimuth angle calculation section 204 calculates an azimuth angle in the up phase from the spectral amplitude value of a target based on two beat signals in their up phase which are different from each other in the directions of the radar beams, calculates an azimuth angle in the down phase from the spectral amplitude value of the target based on two beat signals in their down phase which are different from each other in the directions of the radar beams, and makes use of the two azimuth angles of the target under different observation conditions. As a result, the misdetection prevention rate can be further improved.

Moreover, the azimuth angle determination section 205 selects the output content of the observation data concerning a target to be detected from the amplitude of an interphase difference between the azimuth angle in the up phase and the azimuth angle in the down phase calculated by the azimuth angle calculation section 204, and makes a determination of misdetection based on the amplitude of a difference between the two azimuth angles obtained in the up and down phases, respectively, by making use of the two target azimuth angles under different observation conditions. As a consequence, it is possible not only to improve the misdetection prevention rate but also to make it stable.

Embodiment 2

Although no particular reference has been made in the above-mentioned first embodiment, the direction of the antenna can be controlled so as to make the directions of radar beams at the time of observation in up phases different from those at the time of observation in down phases in accordance with a change in the directions of the radar beams.

Hereinafter, reference will be made to a radar apparatus according to a second embodiment of the present invention in which the direction of a radar beam at the time of observation in the up phase is varied from that at the time of observation in the down phase, while referring to the drawings.

Figure 7:
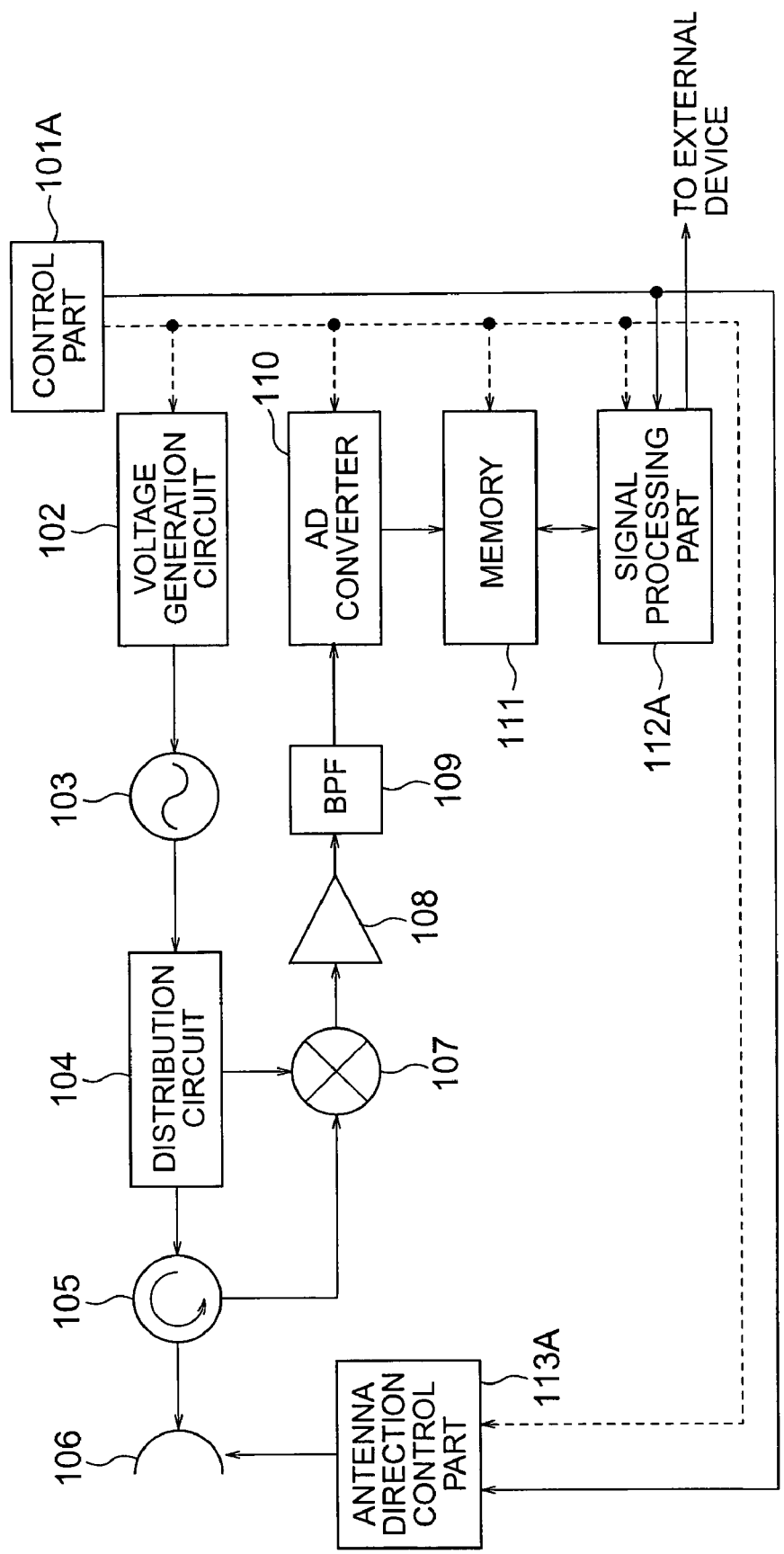
FIG. 7 is a block diagram showing a radar apparatus according to a second embodiment of the present invention.
Figure 8:
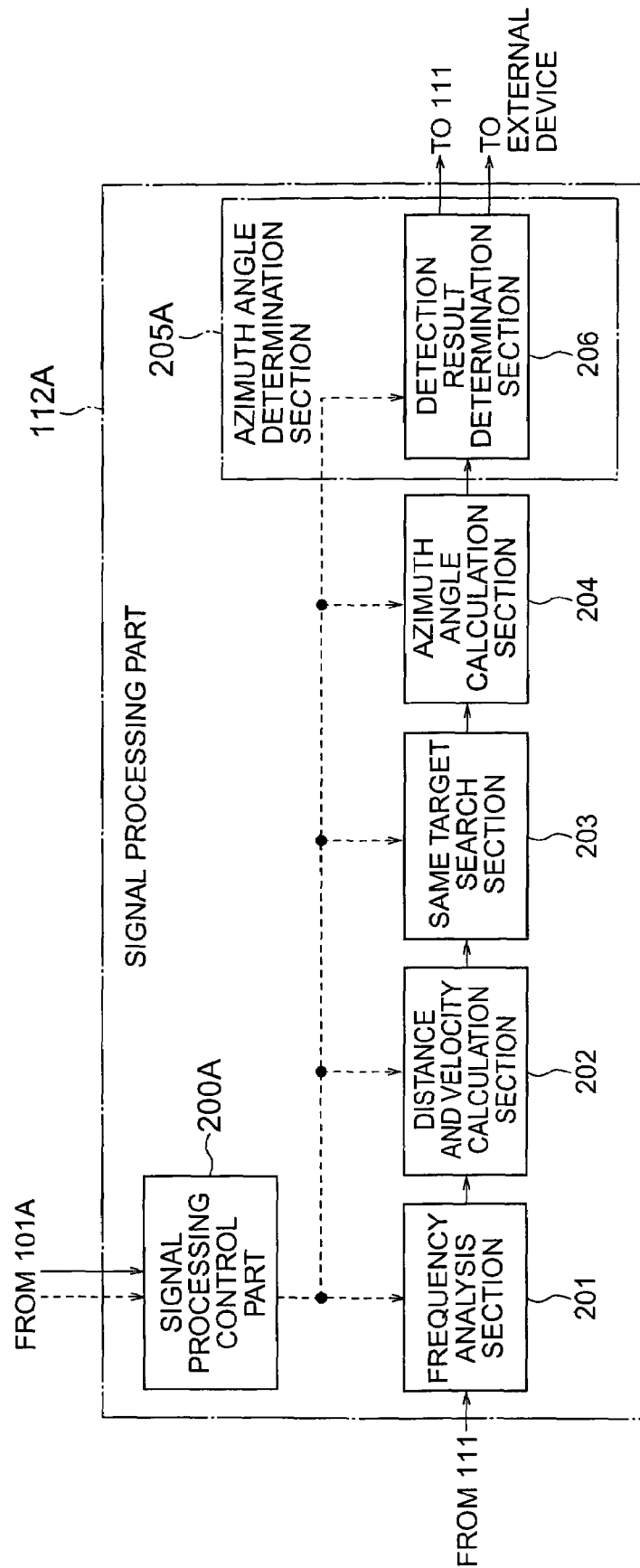
FIG. 8 is a block diagram showing the configuration of a signal processing part in the radar apparatus according to the second embodiment of the present invention.
Figure 9:
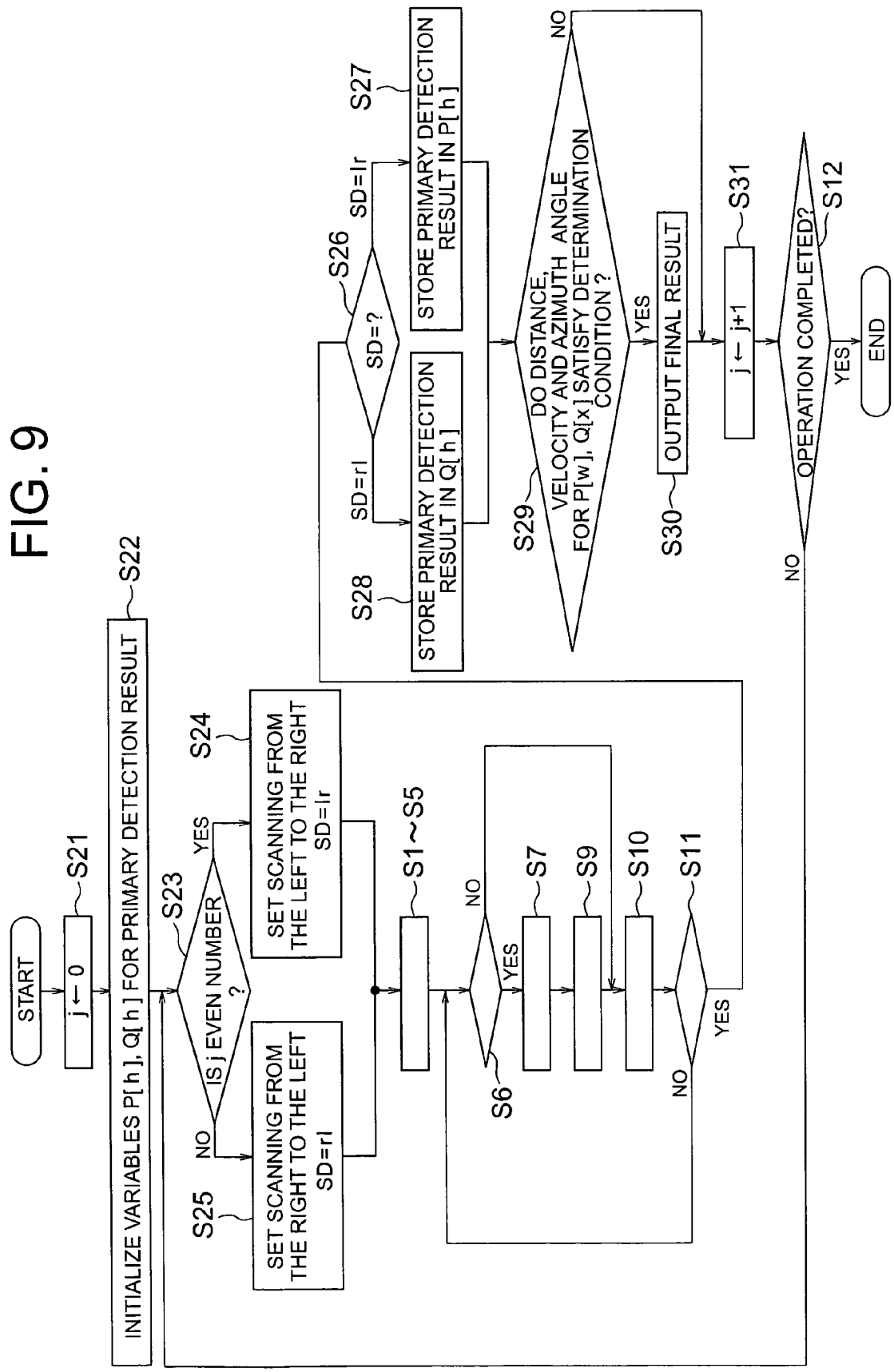
FIG. 9 is an explanatory view showing the signal processing procedure of the radar apparatus according to the second embodiment of the present invention.
Figure 10A:
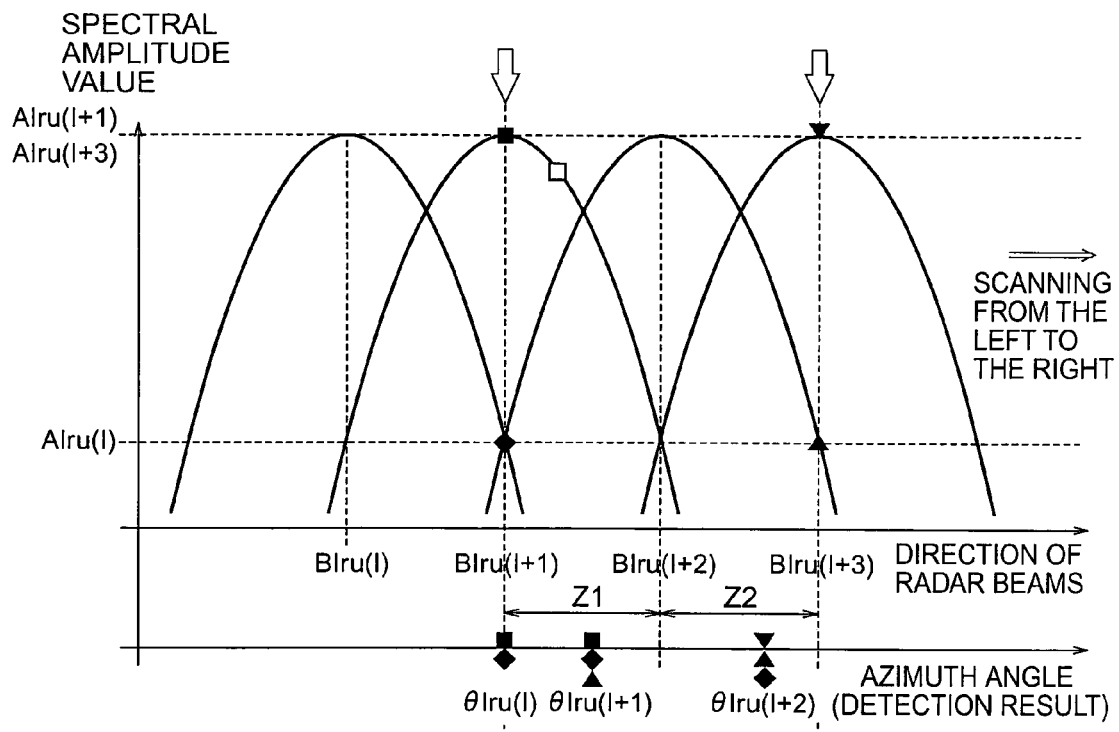
FIGS. 10A and 10B are explanatory views showing the principle of calculating the azimuth angles of targets from the spectral amplitude values thereof when scanning from the left to the right in the second embodiment of the present invention.
Figure 10B:
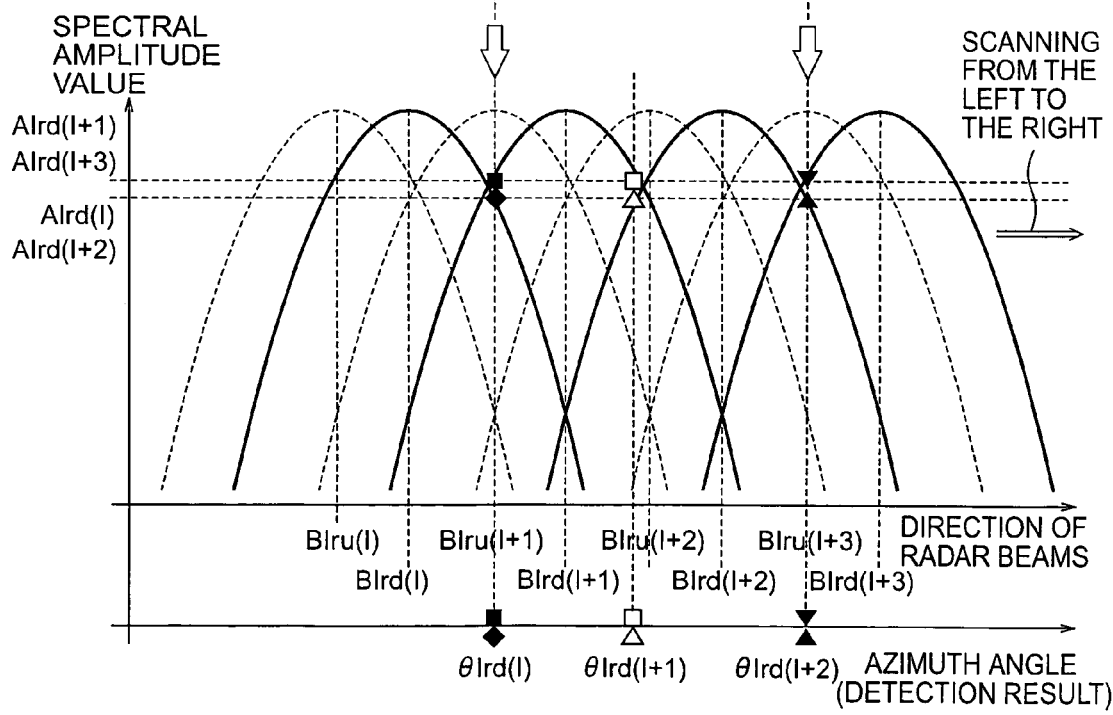
Figure 11A:
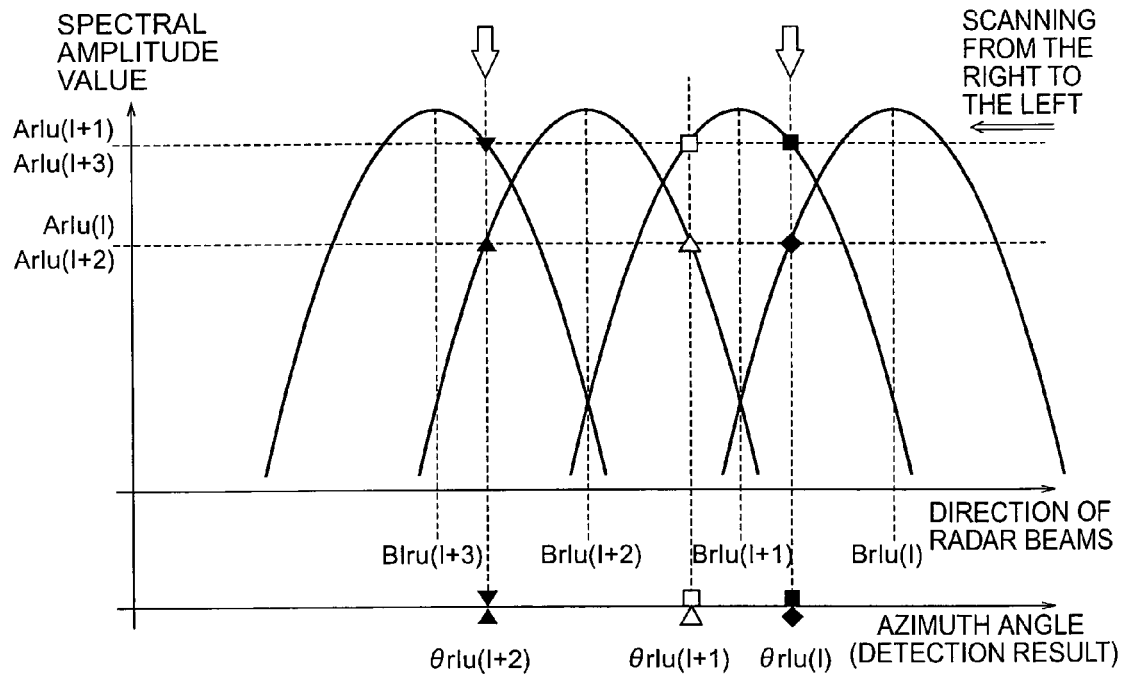
FIGS. 11A and 11B are explanatory views showing the principle of calculating the azimuth angles of targets from the spectral amplitude values thereof when scanning from the right to the left in the second embodiment of the present invention.
Figure 11B:
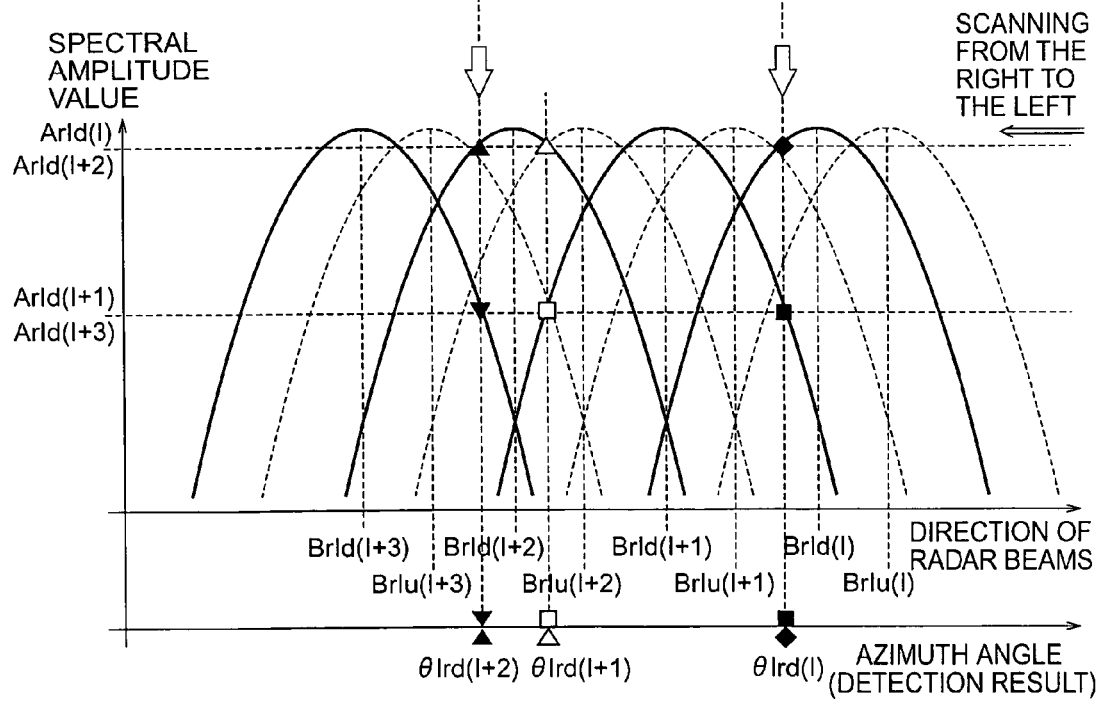

FIG. 7 is a block diagram that illustrates the radar apparatus according to the second embodiment of the present invention, in which the same or corresponding parts or elements as those in the above-mentioned first embodiment (see FIG. 1) are identified by the same symbols. In this case, only part of the functions of a control part 101A, an antenna direction control part 113A, and a signal processing part 112A is different from the functions of the above-mentioned ones. FIG. 8 is a block diagram that illustrates the functional construction of the signal processing part 112A according to the second embodiment of the present invention, in which the same or corresponding components as those in the above-mentioned one (see FIG. 4) are identified by the same symbols while omitting a detailed explanation thereof. FIG. 9 is a block diagram that illustrates an operation of the radar apparatus (the processing procedure of radar signals) according to the second embodiment of the present invention, in which the same or corresponding components as those in the above-mentioned one (see FIG. 5) are identified by the same symbols while omitting a detailed explanation thereof. FIGS. 10A, 10B and FIGS. 11A, 11B are explanatory views showing the principles of calculating the azimuth angles of targets from the spectral amplitude values thereof in the second embodiment of the present invention, in which FIGS. 10A, 10B illustrate an azimuth angle calculation principle in the case of scanning from the left to the right, and FIGS. 11A, 11B illustrate an azimuth angle calculation principle in the case of scanning from the left to the right. In addition, FIG. 10A and FIG. 11A illustrate azimuth angles $\theta$lru, $\theta$rlu in the up phase, respectively, and FIG. 11A and FIG. 11A illustrate azimuth angles $\theta$lrd, $\theta$rld in the down phase, respectively.

In FIG. 7, the antenna direction control part 113A controls the direction of the antenna 106 so as to make the directions of radar beams at the time of observation in up phases different from those at the time of observation in down phases. Specifically, the antenna direction control part 113A controls the direction of the antenna 106 under the control of the control part 101A in such a manner that an interobservation directional difference between the direction of a radar beam at a prescribed observation time and the direction of a radar beam at the following observation time becomes larger than an interphase directional difference between the direction of a radar beam at the time of observation in an up phase and the direction of a radar beam at the time of observation in a down phase.

In FIG. 8, the signal processing part 112A includes an azimuth angle determination section 205A comprising a detection result determination section 206. The detection result determination section 206 selects an output content of the observation data concerning a target to be detected in accordance with a plurality of primary detection results of the observation data calculated by the distance and velocity calculation section 202 and the azimuth angle calculation section 204 at each change in the direction of the radar beam. Specifically, the detection result determination section 206 selects, as an output content of observation data concerning the targets to be detected, a result in which, among a plurality of pieces of observation data obtained from a primary detection result upon each change in the direction of a radar beam, all the mutual distance differences and all the mutual velocity differences are smaller than a first predetermined value, and in which, among all the mutual azimuth angle differences, a predetermined number or more of mutual azimuth angle errors set beforehand are smaller than a second predetermined value.

Next, reference will be made to the operation of the radar apparatus according to this second embodiment of the present invention as shown in FIGS. 7 and 8, while referring to FIG. 9.

In FIG. 9, the control part 101A first initializes a counter internal variable j to zero (i.e., j=0) (step S21). Subsequently, the signal processing control part 200A in the signal processing part 112A initializes a primary detection result internal variable set P[h], Q[h] to be used by the detection result determination section 206 (step S22). Here, note that the respective variables P[h], Q[h] are represented as follows.

$$P[h]=(Rpl[h], Rpr[h], Vpl[h], Vpr[h], \theta pl[h], \theta pr[h])$$

$$Q[h]=(Rql[h], Rqr[h], Vql[h], Vqr[h], \theta ql[h], \theta qr[h])$$

where h is a value within the range of from 1 to Nmax if a maximum number of detections set beforehand is assumed to be Nmax.

Then, by referring to the value of the counter internal variable j, the control part 101A determines whether the variable j is an even number (step S23). When the variable j is determined as an even number (i.e., Yes), a scanning setting for changing the direction of the radar beam from the left to the right with respect to the forward front of the radar (hereinafter referred to as "scanning from the left to the right") is performed (step S24). At this time, the control part 101A outputs to the signal processing part 112A a control signal representative of the scanning from the left to the right, and in response to this control signal, the signal processing control part 200A in the signal processing part 112A sets a scanning direction internal variable SD to lr (i.e., "SD=lr").

In step S24, the control part 101A sets Blru(i) {i=1 through n} and Blrd(i) {i=1 through n} as the directions of the radar beam for scanning from the left to the right into the antenna direction control part 113A. On the other hand, if the variable j is determined as an odd number in step S23 (i.e., No), a scanning setting for changing the direction of the radar beam from the right to the left with respect to the forward front of the radar (hereinafter referred to as "scanning from the right to the left") is performed (step S25). At this time, the control part 101A outputs to the signal processing part 112A a control signal representative of the scanning from the right to the left, and in response to this control signal, the signal processing control part 200A in the signal processing part 112A sets the variable SD to rl (i.e., "SD=rl").

Moreover, in step S25, the control part 101A sets Brlu(i) {i=1 through n} and Brld(i) {i=1 through n} as the directions of the radar beam for scanning from the right to the left into the antenna direction control part 113A. Here, note that the following relation holds between the directions Blru(i), Blrd(i), Brlu(i) and Brld(i) of the radar beam.

$$Blru(i) \neq Brlu(i)$$

$$Blrd(i) \neq Brld(i)$$

Subsequently, the processes (steps S1 through S7 and S9 through S11) similar to the above-mentioned ones (see FIG. 5) are executed, and the antenna direction control part 113A, the voltage generation circuit 102, the AD converter 110, the memory 111 and the signal processing part 112A are operated under the control of the control part 101A. At this time, in scannings from the left to the right (SD=lr), the digitized voltage value of an up phase beat signal in a radar beam of a direction Blru(i) {i=1 through n} and the digitized voltage value of a down phase beat signal in a radar beam of a direction Blrd(i) {i=1 through n} are recorded in the memory 111.

Thereafter, in the signal processing part 112A, the frequency analysis section 201, the distance and velocity calculation section 202, the same target search section 203 and the azimuth angle calculation section 204 are operated under the control of the signal processing control part 200A, so that there are acquired, for instance, primary detection results (Rl[h], Rr[h], Vl[h], Vr[h], θu[h], θd[h]) {h=1 through Nlr} in Nlr(>0) scannings from the left to the right.

Similarly, in scannings from the right to the left (SD=rl), the digitized voltage value of an up phase beat signal in a radar beam of a direction Brlu(i) {i=1 through n} and the digitized voltage value of a down phase beat signal in a radar beam of a direction Brld(i) {i=1 through n} are recorded in the memory 111. Thereafter, in the signal processing part 112A, the frequency analysis section 201, the distance and velocity calculation section 202, the same target search section 203 and the azimuth angle calculation section 204 are operated under the control of the signal processing control part 200A, so that there are acquired, for instance, primary detection results (Rl[h], Rr[h], Vl[h], Vr[h], θu[h], θd[h]) {h=1 through Nrl} in Nrl(>0) scannings from the right to the left.

Hereinafter, when it is determined as i=n in step S11 (i.e., Yes), the signal processing control part 200A subsequently determines whether SD is "lr" or "rl", by referring to the scanning direction internal variable SD (step S26). When it is determined as "SD=lr" in step S26, the detection result determination section 206 takes in Nlr pieces of primary detection results (Rl[h], Rr[h], Vl[h], Vr[h], θu[h], θd[h]) {h=1 through Nlr} from the azimuth angle calculation section 204, and stores the primary detection results thus taken in into the internal variable set P[h] under the control of the signal processing control part 200A (step S27). Specifically, the primary detection results are stored in the variable P[h], as shown by the following expressions (11) through (16).

$$Rpl[h]=Rl[h]\{h=1 \text{ through Nlr}\} \quad (11)$$

$$Rpr[h]=Rr[h]\{h=1 \text{ through Nlr}\} \quad (12)$$

$$Vpl[h]=Vl[h]\{h=1 \text{ through Nlr}\} \quad (13)$$

$$Vpr[h]=Vr[h]\{h=1 \text{ through Nlr}\} \quad (14)$$

$$\theta pl[h]=\theta u[h]\{h=1 \text{ through Nlr}\} \quad (15)$$

$$\theta pr[h]=\theta d[h]\{h=1 \text{ through Nlr}\} \quad (16)$$

On the other hand, when it is determined as "SD=rl" in step S26, the detection result determination section 206 takes in Nrl pieces of primary detection results (Rl[h], Rr[h], Vl[h], Vr[h], θu[h], θd[h]) {h=1 through Nrl} from the azimuth angle calculation section 204, and stores the primary detection results thus taken in into the internal variable set Q[h] under the control of the signal processing control part 200A (step S28). Specifically, the primary detection results are stored in the variable Q[h], as shown by the following expressions (17) through (22).

$$Rql[h]=Rl[h]\{h=1 \text{ through Nrl}\} \quad (17)$$

$$Rqr[h]=Rr[h]\{h=1 \text{ through Nrl}\} \quad (18)$$

$$Vql[h]=Vl[h]\{h=1 \text{ through Nrl}\} \quad (19)$$

$$Vqr[h]=Vr[h]\{h=1 \text{ through Nrl}\} \quad (20)$$

$$\theta ql[h]=\theta u[h]\{h=1 \text{ through Nrl}\} \quad (21)$$

$$\theta qr[h]=\theta d[h]\{h=1 \text{ through Nrl}\} \quad (22)$$

Here, reference will be made to the property of the primary detection results stored in the internal variable set P[h], Q[h] in steps S27, S28 while referring to FIGS. 10A, 10B and FIGS. 11A, 11B.

In FIGS. 10A, 10B, similar to the above discussions, it is assumed that there exist targets (e.g., two targets running side by side) with their distances and velocities being substantially equal to each other in two directions indicated at outline arrows, respectively, and the azimuth angles of the targets during observation of radar beams of n directions are substantially unchanged.

First of all, as shown in FIG. 10A, in the case of scanning from the left to the right, the spectral amplitude value of a beat frequency corresponding to one or a first target in a radar beam of a direction Blru(I) becomes a value Alru(I) indicated at a "black diamond mark"; the spectral amplitude value of a beat frequency corresponding to the first target in a radar beam of a direction Blru(I+1) becomes a value Alru(I+1) indicated at a "black square mark"; and the spectral amplitude value of a beat frequency corresponding to another or a second target in a radar beam of a direction Blru(I+3) is a value Alru(I+3) indicated at a "black inverse triangular mark". In addition, the spectral amplitude value of a beat frequency corresponding to a target in a radar beam of a direction Blru(I+2) becomes a value equal to a sum of the component of the "black diamond mark" and the component of the "black triangular mark".

However, note that the summation or addition at this time is the addition of the two beat signals having the same frequency in a time domain, so the spectral amplitude value thus obtained varies in accordance with the relative phases of these two beat signals. Accordingly, the spectral amplitude value of the beat frequency corresponding to the target in the radar beam of the direction Blru(I+2) varies in accordance with various factors. At this time, in the processes of the above steps S21 through S27, the azimuth angle of the first target is calculated from the spectral amplitude values Alru(I), Alru(I+1) in the radar beams of the directions Blru(I), Blru(I+1) within the range of from the direction Blru(I) to the direction Blru(I+1). As a consequence, an azimuth angle θlru(I) indicated by the "black diamond mark" and the "black square mark" is calculated from the aforementioned expression (5).

On the other hand, an azimuth angle is calculated from the spectral amplitude values Alru(I+1), Alru(I+2) in the radar beams of the directions Blru(I+1), Blru(I+2) within the range of from the direction Blru(I+1) to the direction Blru(I+2), but the spectral amplitude value Alru(I+2) is the result of the addition of the beat signals from both of the targets, as stated above, and hence varies due to various factors. As a consequence, an azimuth θlru(I+1) indicated by the "black square mark", the "black diamond mark" and the "black triangular mark" can vary within a range indicated by an alternate long and short dash line Z1 with arrows in FIG. 10A, 10B.

Similarly, an azimuth angle is calculated from the spectral amplitude values Alru(I+2), Alru(I+3) in the radar beams of the directions Blru(I+2), Blru(I+3) within the range of from the direction Blru(I+2) to the direction Blru(I+3), but the spectral amplitude value Alru(I+2) is the result of the addition of the beat signals from both of the targets, and hence varies due to various factors. Therefore, an azimuth θlru(I+2) indicated by the "black inverse triangular mark", the "black triangular mark" and the "black diamond mark" can vary within a range indicated by an alternate long and short dash line Z2 with arrows in FIGS. 10A, 10B.

Subsequently, in the case of scanning from the left to the right in the down phase, as shown in FIG. 10B, the spectral amplitude value of a beat frequency corresponding to one or a first target in a radar beam of a direction Blrd(I) is a value Alrd(I) indicated at a "black diamond mark"; the spectral amplitude value of a beat frequency corresponding to the first target in a radar beam of a direction Blrd(I+1) is a value Alrd(I+1) indicated at a "black square mark"; the spectral amplitude value of a beat frequency corresponding to another or a second target in a radar beam of a direction Blrd(I+2) is a value Alrd(I+2) indicated at a "black triangular mark"; and the spectral amplitude value of a beat frequency corresponding to the second target in a radar beam of a direction Blrd(I+3) is a value Alrd(I+3) indicated at a "black inverse triangular mark".

At this time, in the processes of the above steps S21 through S27), the azimuth angle of the first target is calculated from the spectral amplitude values Alrd(I), Alrd(I+1) in the radar beams of the directions Blrd(I), Blrd(I+1) within the range of from the direction Blrd(I) to the direction Blrd(I+1). Therefore, an azimuth angle θlrd(I) indicated by the "black diamond mark" and the "black square mark" is calculated from the aforementioned expression (6).

Similarly, the azimuth angle of the second target is calculated from the spectral amplitude values Alrd(I+2), Alrd(I+3) in the radar beams of the directions Blrd(I+2), Blrd(I+3) within the range of from the direction Blrd(I+2) to the direction Blrd(I+3). As a consequence, an azimuth angle θlrd(I+2) indicated by the "black inverse triangular mark" and the "black triangular mark" is calculated from the aforementioned expression (6).

In addition, an azimuth angle is calculated from the spectral amplitude values Alrd(I+1), Alrd(I+2) in the radar beams of the directions Blrd(I+1), Blrd(I+2) within the range of from the direction Blrd(I+1) to the direction Blrd(I+2). Therefore, the spectral amplitude value Alrd(I+1) in the radar beam of the direction Blrd(I+1) is assumed to be a value not indicated at the "black square mark" but at the "□ mark", and the spectral amplitude value Alrd(I+2) in the radar beam of the direction Blrd(I+2) is assumed to be a value not indicated at the "black triangular mark" but at the "Δ mark". Accordingly, an azimuth angle θlrd(I+1) indicated by the "□ mark" and the "Δ mark" is calculated from the aforementioned expression (6).

Here, considering the results in the scanning from the left to the right see FIGS. 10A, 10B), an interphase azimuth angle difference between θ lru(I) and θlrd(I) in each phase is relatively small and hence output as a detection result according to the determination condition or criterion of the aforementioned expression (7).

On the other hand, for azimuth angles θlru(I+2), θlrd(I+2) in the subsequent respective phases, the value of the azimuth angle θlru(I+2) in the up phase can vary. Therefore, an interphase azimuth angle difference between θlru(I+2) and θlrd(I+2) becomes larger, so there is a possibility that this interphase azimuth angle difference might not be output as a detection result according to the criterion of the aforementioned expression (7).

Further, for azimuth angles θlru(I+1), θlrd (I+1) in respective phases, the value of the azimuth angle θlru (I+1) in the up phase can vary. Accordingly, an interphase azimuth angle difference between θlru(I+1) and θlrd(I+1) becomes smaller, so there is a possibility that this interphase azimuth angle difference might be output as a detection result according to the criterion of the aforementioned expression (7).

Then, in the case of scanning from the right to the left in the up phase, as shown in FIG. 11A, the spectral amplitude value of a beat frequency corresponding to the first target in a radar beam of a direction Brlu(I) is a value Arlu(I) indicated at a "black diamond mark"; the spectral amplitude value of a beat frequency corresponding to the first target in a radar beam of a direction Brlu(I+1) is a value Arlu(I+1) indicated at a "black square mark"; the spectral amplitude value of a beat frequency corresponding to the second target in a radar beam of a direction Brlu(I+2) is a value Arlu(I+2)

indicated at a "black triangular mark"; and the spectral amplitude value of a beat frequency corresponding to the second target in a radar beam of the direction Brlu(I+3) is a value Arlu(I+3) indicated at a "black inverse triangular mark".

At this time, in the processes of the above steps S1 through S28, the azimuth angle of the first target is calculated from the spectral amplitude values Arlu(I), Arlu(I+1) in the radar beams of the directions Brlu(I), Brlu(I+1) within the range of from the direction Brlu(I) to the direction Brlu(I+1). As a consequence, an azimuth angle θrlu(I) indicated by the "black diamond mark" and the "black square mark" is calculated from the aforementioned expression (5).

Similarly, the azimuth angle of the second target is calculated from the spectral amplitude values Arlu(I+2), Arlu(I+3) in the radar beams of the directions Brlu(I+2), Brlu(I+3) within the range of from the direction Brlu(I+2) to the direction Brlu(I+3). Accordingly, an azimuth angle θrlu(I+2) indicated by the "black inverse triangular mark" and the "black triangular mark" is calculated from the aforementioned expression (5).

Further, an azimuth angle is calculated from the spectral amplitude values Arlu(I+1), Arlu(I+2) in the radar beams of the directions Brlu(I+1), Brlu(I+2) within the range of from the direction Brlu(I+1) to the direction Brlu(I+2). Therefore, the spectral amplitude value Arlu(I+1) in the radar beam of the direction Brlu(I+1) is assumed to be a value not indicated at the "black square mark" but at the "□ mark", and the spectral amplitude value Arlu(I+2) in the radar beam of the direction Brlu(I+2) is assumed to be a value not indicated at the "black triangular mark" but at the "Δ mark". As a consequence, an azimuth angle θu(I+2) indicated by the "□ mark" and the "Δ mark" is also calculated from the aforementioned expression (5).

Subsequently, in the case of scanning from the right to the left in the down phase, as shown in FIG. 11B, the spectral amplitude value of a beat frequency corresponding to the first target in a radar beam of a direction Brld(I) is a value Arld(I) indicated at a "black diamond mark"; the spectral amplitude value of a beat frequency corresponding to the first target in a radar beam of a direction Brld(I+1) is a value Arld(I+1) indicated at a "black square mark"; the spectral amplitude value of a beat frequency corresponding to the second target in a radar beam of a direction Brld(I+2) is a value Arld(I+2) indicated at a "black triangular mark"; and the spectral amplitude value of a beat frequency corresponding to the second target in a radar beam of a direction Brld(I+3) is a value Arld(I+3) indicated at a "black inverse triangular mark".

At this time, in the processes of the above steps S21 through S27), the azimuth angle of the first target is calculated from the spectral amplitude values Ardd(I), Ardd(I+1) in the radar beams of the directions Brld(I), Brld(I+1) within the range of from the direction Brld(I) to the direction Brld(I+1). As a consequence, an azimuth angle θrld(I) indicated by the "black diamond mark" and the "black square mark" is calculated from the aforementioned expression (6).

Similarly, the azimuth angle of the second target is calculated from the spectral amplitude values Arld(I+2), Arld(I+3) in the radar beams of the directions Brld(I+2), Brld(I+3) within the range of from the direction Brld(I+2) to the direction Brld(I+3). Accordingly, an azimuth angle θrld(I+2) indicated by the "black inverse triangular mark" and the "black triangular mark" is calculated from the aforementioned expression (6).

In addition, an azimuth angle is calculated from the spectral amplitude values Arld(I+1), Arld(I+2) in the radar beams of the directions Brld(I+1), Brld(I+2) within the range of from the direction Brld(I+1) to the direction Brld(I+2). Accordingly, the spectral amplitude value Arld(I+1) in the radar beam of the direction Brld(I+1) is assumed to be a value not indicated at the "black square mark" but at the "□ mark", and the spectral amplitude value Arld(I+2) in the radar beam of the direction Brld(I+2) is assumed to be a value not indicated at the "black triangular mark" but at the "Δ mark". As a consequence, an azimuth angle θrld(I+2) indicated at the "□ mark" and the "Δ mark" is calculated from the aforementioned expression (6).

Here, considering the results in the scannings from the right to the left see FIGS. 11A, 11B), an interphase azimuth angle difference between the azimuth angles θlru(I) and θlrd(I) and an interphase azimuth angle difference between the azimuth angles θlru(I+2) and θlrd(I+2) are relatively small in comparison with an interphase azimuth angle difference between the azimuth angles θlru(I+1) and θlrd(I+1) in each phase. Accordingly, the azimuth angles θlru(I) (or θlrd(I)) and θlru(I+2) (or θlrd(I+2)) are output as detection results according to the criterion of the aforementioned expression (7).

From the above detection results, it is found that there is a possibility that correct detection results might not be obtained in case where the directions of radar beams at the time of scanning from the left to the right (see FIGS. 10A, 10B) are the same as those at the time of scanning from the right to the left (see FIGS. 11A, 11B). Accordingly, to cope with this situation so as to obtain correct detection results, the following four detection results (A) through (D) are first acquired by changing the directions of radar beams between the case of scanning from the left to the right (see FIGS. 10A, 10B) and the case of scanning from the right to the left (see FIGS. 11A, 11B).

(A) A primary detection result in an up phase upon scanning from the left to the right.

(B) A primary detection result in a down phase upon scanning from the left to the right.

(C) A primary detection result in a up phase upon scanning from the right to the left.

(D) A primary detection result in a down phase upon scanning from the right to the left.

Then, it is possible to output a correct detection result by selecting only a result in which mutual distance differences and mutual velocity differences are small, and in which mutual azimuth angle differences with respect to three of the four azimuth angles θlru(i), θlrd(i), θrlu(i) and θrld(i) are small. Here, note that as a procedure for changing the directions of radar beams, the beam direction changing procedure according to the first embodiment of the present invention (see FIG. 3) can make a difference in the directions of radar beams between the case of scanning from the right to the left (see FIGS. 10A, 10B) and the case of scanning from the left to the right (see FIGS. 11A, 11B) more easily than the conventional apparatus (the aforementioned first patent document) does.

Reverting to FIG. 9, following the processing of storing the primary detection result (steps S27, S28), the detection result determination section 206 (see FIG. 8) determines, under the control of the signal processing control part 200A, whether each variable set P[h], Q[h] satisfies the above-mentioned conditional expression, by making use of the property of the above-mentioned primary detection result (step S29). That is, a determination is made as to whether the distance difference and the velocity difference of each variable set are small, and whether a mutual azimuth angle difference of a specific combination of three of the four azimuth angles θlru(i), θlrd(i), θrlu(i) and θrld(i) is smaller than that of any other combination of three azimuth angles.

When it is determined in step S29 that the determination condition or criterion is not satisfied (i.e., No), the control flow advances to step S31 at once, whereas when it is determined that the criterion is satisfied (i.e., Yes), a final detection result is selected and output (step S30), and then the control flow advances to step S31. Specifically, for example, by using preset error tolerance thresholds $\Delta R$, $\Delta V$ and $\Delta \theta$ while referring to variables $P[w]$, $Q[x]$ for the primary detection results, the detection result determination section 206 selects only a primary detection result that satisfies not only the following four relational expressions (23) through (26) but also three or more of the following four conditional expressions (27) through (30).

$$|Rpl[w]-Rql[x]| \leq \Delta R \quad (23)$$

$$|Rpr[w]-Rqr[x]| \leq \Delta R \quad (24)$$

$$|Vpl[w]-Vql[x]| \leq \Delta V \quad (25)$$

$$|Vpr[w]-Vqr[x]| \leq \Delta V \quad (26)$$

$$|\theta pl[w]-\theta pr[y]| \leq \Delta \theta \quad (27)$$

$$|\theta pl[w]-\theta ql[x]| \leq \Delta \theta \quad (28)$$

$$|\theta pl[w]-\theta qr[x]| \leq \Delta \theta \quad (29)$$

$$|\theta pr[x]-\theta qr[y]| \leq \Delta \theta \quad (30)$$

where variables w, x, y and z are values within the range of 1 through Nlr, respectively, and satisfy the following relations: $y \neq w$ and $z \neq x$.

In the case of the presence of the primary detection result selected in step S29, then in step S30, the detection result determination section 206 calculates, from the primary detection result thus selected, the average values of the distances, the velocities and the azimuth angles, for example, under the control of the signal processing control part 200A, and outputs these average values as final observation data.

Subsequently, in step S31, the control part 101A increments the internal variable j for the scanning direction of the radar beam, and advances to the above-mentioned operation completion determination processing (step S12). In step S12, similarly as stated above, the signal processing control part 200A notifies to the control part 101 the completion of the processing for the entire observation space, and in response to this, the control part 101 determines whether the operation has been completed. When it is determined in step S12 that the operation has not yet been completed (i.e., No), a return is carried out to step S23 where the following observation is started, whereas when determined that the operation has been completed (i.e., Yes), the processing routine of FIG. 9 is terminated.

In this manner, the antenna direction control part 113 turns the antenna 106 under the control of the control part 101A in such a manner that the direction of a radar beam is varied between at the time of observation in up phases and at the time of observation in down phases, and at the same time, it also turns the direction of the antenna 106 so as to make the direction of a radar beam at the time of observation in up phases different from that at the time of observation in down phases depending upon a change in the direction of the radar beam (i.e., the direction of scanning).

In addition, the azimuth angle determination section 205A includes a detection result determination section 206, and selects an output content for targets to be detected in accordance with the primary detection result of observation data (distance, velocity and azimuth angle) acquired from the distance and velocity calculation section 202 and the azimuth angle calculation section 204 at each change in the direction of the radar beam. Thus, the misdetection prevention rate can be improved by making use of a plurality of pieces of target information under different observation conditions.

Moreover, the detection result determination section 206 selects, as an output content of targets to be detected, a result in which, with respect to a plurality of pieces of observation data (distance, velocity and azimuth angle) obtained from a primary detection result upon each change in the direction of a radar beam (i.e., the direction of scanning), all the mutual distance differences and all the mutual velocity differences are small, and in which, among all the mutual azimuth angle differences, a predetermined number or more of mutual azimuth angle errors set beforehand are small. Accordingly, it is possible not only to improve the misdetection prevention rate but also to make it stable by making use of a plurality of pieces of target information under different observation conditions.

Furthermore, the antenna direction control part 113A controls the direction of the antenna 106 in such a manner that an interobservation directional difference between the direction of a radar beam at the time of observation in a certain up phase (or in a certain down phase) and the direction of a radar beam at the time of observation in the following up phase (or in the following down phase) becomes larger than an interphase directional difference between the direction of a radar beam at the time of observation in an up phase and the direction of a radar beam at the time of observation in a down phase. As a consequence, misdetection can be prevented by using a plurality of pieces of target information under different observation conditions.

While the invention has been described in terms of preferred embodiments, those skilled in the art will recognize that the invention can be practiced with modifications within the spirit and scope of the appended claims.

What is claimed is:

1. A radar apparatus adapted to send and receive radar beams as a transmitted signal and a received signal, respectively, while changing the direction of an antenna so as to change the direction of said radar beams with respect to said antenna, observe beat signals created by mixing said transmission and received signals frequency modulated of up phases and down phases with each other, detect a target to be observed, and measure observation data including a relative distance, a relative velocity or an azimuth angle of said target with respect to said antenna, said apparatus comprising:

an antenna direction control part that turns said radar beams in a plurality of preset directions;

a frequency analysis section that extracts a beat frequency and a spectral amplitude value corresponding to said target from said beat signals in radar beams of predetermined directions;

a distance and velocity calculation section that calculates the distance and velocity of said target based on said beat frequency in a radar beam of a predetermined direction;

a same target search section that searches for the distance and velocity of the same target observed in two of said radar beams of different directions from the distances and velocities of targets calculated in said two radar beams;

an azimuth angle calculation section that calculates the azimuth angle of said same target based on the spectral amplitude values of said same target observed in said two radar beams: and an azimuth angle determination section that selects an output content of said observation data concerning a target to be detected based on the azimuth angle of said same target calculated in said two radar beams.

2. A radar apparatus adapted to send and receive radar beams as a transmitted signal and a received signal, respectively, while changing the direction of an antenna so as to change the direction of said radar beams with respect to said antenna, observe beat signals created by mixing said transmission and received signals frequency modulated of up phases and down phases with each other, detect a target to be observed and measure observation data including a relative distance, a relative velocity or an azimuth angle of said target with respect to said antenna, said apparatus comprising:

an antenna direction control part that turns said radar beams in a plurality of preset directions;

a frequency analysis section that extracts a beat frequency and a spectral amplitude value corresponding to said target from said beat signals in radar beams of predetermined directions;

a distance and velocity calculation section that calculates the distance and velocity of said target based on said beat frequency in a radar beam of a predetermined direction;

a same target search section that searches for the distance and velocity of the same target observed in two of said radar beams of different directions from the distances and velocities of targets calculated in said two radar beams;

an azimuth angle calculation section that calculates the azimuth angle of said same target based on the spectral amplitude values of said same target observed in said two radar beams: and an azimuth angle determination section that selects an output content of said observation data concerning a target to be detected based on the azimuth angle of said same target calculated in said two radar beams, wherein said antenna direction control part turns said antenna in such a manner that the directions of said radar beams are varied at the time of observation in said up phases and at the time of observation in said down phases; and said azimuth angle calculation section calculates, based on the spectral amplitude values of said target in two up phases of said radar beams of different directions, the azimuth angle of said target in said up phases, and further calculates, based on the spectral amplitude values of said target in two down phases of said radar beams of different directions, the azimuth angle of said target in said down phases.

3. The radar apparatus as set forth in claim 2, wherein said azimuth angle determination section selects an output content of observation data concerning said target to be detected from the amplitude of an interphase azimuth angle difference between the azimuth angle of said target in said up phases and the azimuth angle of said target in said down phases calculated by said azimuth angle calculation section.

4. A radar apparatus adapted to send and receive radar beams as a transmitted signal and a received signal, respectively, while changing the direction of an antenna so as to change the direction of said radar beams with respect to said antenna, observe beat signals created by mixing said transmission and received signals frequency modulated of up phases and down phases with each other, detect a target to be observed, and measure observation data including a relative distance, a relative velocity or an azimuth angle of said target with respect to said antenna, said apparatus comprising:

an antenna direction control part that turns said radar beams in a plurality of preset directions;

a frequency analysis section that extracts a beat frequency and a spectral amplitude value corresponding to said target from said beat signals in radar beams of predetermined directions;

a distance and velocity calculation section that calculates the distance and velocity of said target based on said beat frequency in a radar beam of a predetermined direction;

a same target search section that searches for the distance and velocity of the same target observed in two of said radar beams of different directions from the distances and velocities of targets calculated in said two radar beams;

an azimuth angle calculation section that calculates the azimuth angle of said same target based on the spectral amplitude values of said same target observed in said two radar beams: and an azimuth angle determination section that selects an output content of said observation data concerning a target to be detected based on the azimuth angle of said same target calculated in said two radar beams, wherein said antenna direction control part controls the direction of said antenna so as to make the directions of said radar beams at the time of observation in said up phases different from those at the time of observation in said down phases in accordance with a change in the directions of said radar beams; and said azimuth angle determination section includes a detection result determination section that selects an output content of observation data concerning said target to be detected in accordance with a plurality of primary detection results of said observation data calculated by said distance and velocity calculation section and said azimuth angle calculation section at each change in the directions of said radar beams.

5. The radar apparatus as set forth in claim 4, wherein said detection result determination section selects, as an output content of observation data concerning said target to be detected, a result in which, among a plurality of pieces of observation data obtained from a primary detection result upon each change in the directions of said radar beams, all mutual distance differences and all mutual velocity differences are smaller than a first predetermined value, and in which, among all mutual azimuth angle differences, a predetermined number or more of mutual azimuth angle errors set beforehand are smaller than a second predetermined value.

6. The radar apparatus as set forth in claim 2, wherein said antenna direction control part controls the direction of said antenna in such a manner that an interobservation directional difference between the direction of a radar beam at a prescribed observation time and the direction of a radar beam at the following observation time becomes larger than a interphase directional difference between the direction of a radar beam at the time of observation in an up phase and the direction of a radar beam at the time of observation in a down phase.

7. A radar signal processing method adapted to send and receive radar beams as a transmitted signal and a received signal, respectively, while changing the direction of an antenna so as to change the direction of said radar beams with respect to said antenna, observe beat signals created by mixing said transmission and received signals frequency modulated of up phases and down phases with each other, detect a target to be observed, and measure observation data including a relative distance, a relative velocity or an azimuth angle of said target with respect to said antenna, said method comprising:

a first step of turning said radar beams in a plurality of preset directions;

a second step of extracting a beat frequency and a spectral amplitude value corresponding to said target from a beat signal in a radar beam of a predetermined direction;

a third step of calculating the distance and velocity of said target based on said beat frequency of said radar beam of said predetermined direction;

a fourth step of searching for the distance and velocity of the same target observed in two radar beams from the distances and velocities of targets calculated in the two radar beams of different directions;

a fifth step of calculating the azimuth angle of said same target based on the spectral amplitude value of said same target observed in said two radar beams; and a sixth step of selecting an output content of observation data concerning a target to be detected based on the azimuth angle of said same target calculated in said two radar beams.

8. A radar signal processing method adapted to send and receive radar beams as a transmitted signal and a received signal, respectively, while changing the direction of an antenna so as to change the direction of said radar beams with respect to said antenna, observe beat signals created by mixing said transmission and received signals frequency modulated of up phases and down phases with each other, detect a target to be observed, and measure observation data including a relative distance, a relative velocity or an azimuth angle of said target with respect to said antenna, said method comprising:

a first step of turning said radar beams in a plurality of preset directions;

a second step of extracting a beat frequency and a spectral amplitude value corresponding to said target from a beat signal in a radar beam of a predetermined direction;

a third step of calculating the distance and velocity of said target based on said beat frequency of said radar beam of said predetermined direction;

a fourth step of searching for the distance and velocity of the same target observed in two radar beams from the distances and velocities of targets calculated in the two radar beams of different directions;

a fifth step of calculating the azimuth angle of said same target based on the spectral amplitude value of said same target observed in said two radar beams; and a sixth step of selecting an output content of observation data concerning a target to be detected based on the azimuth angle of said same target calculated in said two radar beams, wherein said first step includes a seventh step of controlling the direction of said antenna so as to make the directions of said radar beams at the time of observation in said up phases different from those at the time of observation in said down phases; and said fifth step includes:

an eighth step of calculating, based on the spectral amplitude values of said target in two up phases of said radar beams of different directions, the azimuth angle of said target in said up phases; and a ninth step of calculating, based on the spectral amplitude values of said target in two down phases of said radar beams of different directions, the azimuth angle of said target in said down phases.

9. The radar signal processing method as set forth in claim 8, wherein said sixth step includes a tenth step of selecting an output content of observation data concerning said target to be detected from the amplitude of an interphase azimuth angle difference between the azimuth angle of said target in said up phases and the azimuth angle of said target in said down phases calculated in said eighth step and said ninth step.

10. A radar signal processing method adapted to send and receive radar beams as a transmitted signal and a received signal, respectively, while changing the direction of an antenna so as to change the direction of said radar beams with respect to said antenna, observe beat signals created by mixing said transmission and received signals frequency modulated of up phases and down phases with each other, detect a target to be observed, and measure observation data including a relative distance, a relative velocity or an azimuth angle of said target with respect to said antenna, said method comprising:

a first step of turning said radar beams in a plurality of preset directions;

a second step of extracting a beat frequency and a spectral amplitude value corresponding to said target from a beat signal in a radar beam of a predetermined direction;

a third step of calculating the distance and velocity of said target based on said beat frequency of said radar beam of said predetermined direction;

a fourth step of searching for the distance and velocity of the same target observed in two radar beams from the distances and velocities of targets calculated in the two radar beams of different directions;

a fifth step of calculating the azimuth angle of said same target based on the spectral amplitude value of said same target observed in said two radar beams; and a sixth step of selecting an output content of observation data concerning a target to be detected based on the azimuth angle of said same target calculated in said two radar beams, wherein said first step includes an eleventh step of controlling the direction of said antenna so as to make the directions of said radar beams at the time of observation in said up phases different from those at the time of observation in said down phases in accordance with a change in the directions of said radar beams; and said sixth step includes a twelfth step of selecting an output content of observation data concerning said target to be detected in accordance with a plurality of primary detection results of said observation data calculated at each change in the directions of said radar beams.

11. The radar signal processing method as set forth in claim 10, wherein said twelfth step includes a thirteenth step of selecting, as an output content of observation data concerning said target to be detected, a result in which, among a plurality of pieces of observation data obtained from a primary detection result upon each change in the directions of said radar beams, all mutual distance differences and all mutual velocity differences are smaller than a first predetermined value, and in which, among all mutual azimuth angle differences, a predetermined number or more of mutual azimuth angle errors set beforehand are smaller than a second predetermined value.

* * * * *